United States Patent
Du et al.

(10) Patent No.: US 8,422,958 B2
(45) Date of Patent: Apr. 16, 2013

(54) EXPLOITING MULTIPLE ANTENNAS FOR SPECTRUM SENSING IN COGNITIVE RADIO NETWORKS

(75) Inventors: Ke Lin Du, Verdun (CA); Wai Ho Mow, Hong Kong (CN)

(73) Assignee: Lingna Holdings Pte., LLC, Wilmington, DE (US)

( * ) Notice: Subject to any disclaimer, the term of this patent is extended or adjusted under 35 U.S.C. 154(b) by 0 days.

(21) Appl. No.: 13/485,530

(22) Filed: May 31, 2012

(65) Prior Publication Data

US 2012/0238201 A1    Sep. 20, 2012

Related U.S. Application Data

(63) Continuation of application No. 12/425,754, filed on Apr. 17, 2009, now Pat. No. 8,213,868.

(51) Int. Cl.
*H04B 1/00* (2006.01)
(52) U.S. Cl.
USPC .......................................................... 455/63.1
(58) Field of Classification Search ........................ None
See application file for complete search history.

(56) References Cited

U.S. PATENT DOCUMENTS

| | | | |
|---|---|---|---|
| 7,904,021 B2 | 3/2011 | Yonge | |
| 7,953,412 B2 | 5/2011 | Lee et al. | |
| 8,175,539 B2 * | 5/2012 | Diener et al. | 455/69 |
| 2012/0034874 A1 * | 2/2012 | Yiu et al. | 455/63.1 |

OTHER PUBLICATIONS

OA dated Nov. 18, 2011 for U.S. Appl. No. 12/425,754, 14 pages.
Agee, et al. "Spectral self-coherent restoral: A new approach to blind adaptive signal extraction using antenna arrays," Proc. IEEE, 78(4), Apr. 1990, 753-767. Last accessed Aug. 27, 2009, 15 pages.
Chen, et al. In-Band Sensing without Quiet Period in Cognitive Radio. 1525-3511/08 IEEE, Wireless Communications and Networking Conference, 2008. Mar. 31 2008-Apr. 3 2008, pp. 723-728. Last accessed Aug. 27, 2009, 15 pages.
Gardener. "Signal interception: a unifying theoretical framework for feature detection,", IEEE Trans Commun., 36 (8), Aug. 1988, 897-906. 0090-6778/88/0800-0 IEEE, last accessed Aug. 27, 2009, 10 pages.

(Continued)

*Primary Examiner* — Lincoln Donovan
*Assistant Examiner* — Sibin Chen
(74) *Attorney, Agent, or Firm* — Turocy & Watson, LLP

(57) ABSTRACT

Spectrum sensing in wireless communications is provided to identify utilized and/or unutilized frequency bands reserved for primary users using a cyclostationary beamforming approach. An adaptive cross self-coherent restoral (ACS) algorithm can be utilized to extract signals of interest (SOI) at unique cycle frequencies related to primary and/or secondary users from an antenna array measurement. Based on the SOI, one or more users of the spectrum can be identified or the spectrum can be regarded as vacant; this can be based on lobe identification in the frequency spectrum of the SOI, in one example. This mechanism is less complex than traditional cyclic spectrum analysis methods. The cyclostationary beamforming based approach is more effective than the energy detection method. Also, the need for quiet periods in spectrum sensing is eliminated when using this mechanism such that signals can be transmitted simultaneously with receiving signals over the antenna array.

20 Claims, 18 Drawing Sheets

OTHER PUBLICATIONS

Han, et al. "Replacement of Spectrum Sensing and Avoidance of Hidden Terminal for Cognitive Radio," Proc. Wireless Communications and Networking Conference, 2008, Mar. 31, 2008-Apr. 3, 2008, pp. 1448-1452.

Haykin. "Cognitive radio: Brain-empowered wireless communications," IEEE Journal on Selected Areas in Communications Feb. 2005, vol. 23, issue 5, 201-220. Last accessed Aug. 28, 2009, 20 pages.

Heath, et al. "Exploiting Input Cyclostationarity for Blind Channel Identification in OFDM Systems," IEEE Trans. Signal Processing, 47 (3), Mar. 1999, 848-856. http://citeseerx.ist.psu.edu/viewdoc/summary?doi=10.1.1.23.5678. Last accessed Aug. 28, 2009, 9 pages.

Jeon, et al. An Efficient Quiet Period Management Scheme for Cognitive Radio Systems. IEEE Trans. Wireless Commun., 7(2), Feb. 2008, pp. 505-509. Last accessed Aug. 28, 2009, 5 pages.

Ji, et al. Channel Sensing Based on Self-Signal Suppression (SSS), IEEE P802.22 Wireless RANs, Samsung, Jul. 19, 2006. https://mentor.ieee.org/802.22/dcn/06/22-06-0121-01-0000-samsung-sss-based-channel-sensing.ppt. Last accessed Aug. 28, 2009, 11 pages.

Li, et al. Robust Joint Interference Detection and Decoding for OFDM-Based Cognitive Radio Systems With Unknown Interference. IEEE JSAC, 25(3), Apr. 2007, pp. 566-575. Last accessed Aug. 28, 2009, 10 pages.

Liang, et al. Sensing-Throughput Tradeoff for Cognitive Radio Networks. IEEE Trans. Wireless Commun., 7(4), Apr. 2008, pp. 1326-1337. http://www3.ntu.edu.sg/Centre/pwtc/study_group/28th%20Jan%2009/Sensing-throughput%20tradeoff%20for%20cognitive%20radio%20networks.pdf. Last accessed Aug. 28, 2009, 12 pages.

Luby. LT Codes. Proc. of the 43rd Annual IEEE Symposium on Foundations of Computer Science, Vancouver, Canada, Nov. 2002, pp. 271-282. http://pages.cs.wisc.edu/~suman/courses/740/papers/luby02lt.pdf. Last accessed Aug. 28, 2009, 10 pages.

Lunden, et al. Spectrum Sensing in Cognitive Radios Based on Multiple Cyclic Frequencies. Proc. 2nd Int. Conf. on Cognitive Radio Oriented Wireless Networks and Commun., Orlando, FL, USA, Jul.-Aug. 2007. http://arxiv.org/PS_cache/arxiv/pdf/0707/0707.0909v1.pdf. Last accessed Aug. 28, 2009, 7 pages.

Mitola III, et al. Cognitive Radio: Making Software Radios More Personal. IEEE Personal Commun, Aug. 1999, 13-18. http://www.comsoc.org/pci/private/1999/aug/pdf/Mitola.pdf. Last accessed Aug. 28, 2009, 6 pages.

Oner, et al. "Air Interface Recognition for a Software Radio System Exploiting Cyclostationarity," Proc.15th IEEE Int. Symp. Personal, Indoor and Mobile Radio Comm. (PIMRC'04), Barcelona, Spain, Sep. 2004, vol. 3, pp. 1947-1951. Last accessed Aug. 28, 2009, 5 pages.

Quan, et al. Wideband Spectrum Sensing in Cognitive Radio Networks. Proc. IEEE ICC'08, Beijing, China, May 2008, 901-906. http://arxiv.org/PS_cache/arxiv/pdf/0802/0802.4130v1.pdf. Last accessed Aug. 28, 2009, 6 pages.

Sahai, et al. Some Fundamental Limits on Cognitive Radio. Proc. of 42th Allerton Conf. Commun., Control, and Computing, Monticello, IL, Oct. 2004., pp. 1-11. http://www.eecs.berkeley.edu/~sahai/Papers/cognitive_radio_preliminary.pdf. Last accessed Aug. 28, 2009, 11 pages.

Sutton, et al. Cyclostationary Signatures for Rendezvous in OFDM-based Dynamic Spectrum Access Networks. Proc. IEEE Int. Symp. on New Frontiers in Dynamic Spectrum Access Networks (DySPAN'07), Dublin, Ireland, Apr. 2007, pp. 220-231. http://www.mee.tcd.ie/~ledoyle/EMERGINGNETWORKS/pages/pubs/27.pdf. Last accessed Aug. 28, 2009, 12 pages.

Sutton, et al. Cyclostationary Signatures in Practical Cognitive Radio Applications. IEEE JSAC, 26(1), Jan. 2008, pp. 13-24. http://www.tara.tcd.ie/bitstream/2262/29766/1/cyclostationary.pdf. Last accessed Aug. 28, 2009, 12 pages.

Tian, et al. A Wavelet Approach to Wideband Spectrum Sensing for Cognitive Radios. Proc. IEEE 1st Int. Conf. Cognitive Radio Oriented Wireless Networks and Communications, Greece, Jun. 2006, pp. 1-5. http://www.ece.mtu.edu/faculty/ztian/papers/crowncom06_wavelet.pdf. Last accessed Aug. 28, 2009, 5 pages.

Vucic, et al. Spectral Correlation of OFDM Signals Related to Their PLC Applications. Proc. 6th Int. Symp. Power-Line Comm. and Its Applications (ISMPLC), Athens, Greece, Mar. 2002. http://www.isplc.org/docsearch/Proceedings/2002/pdf/11110133.pdf. Last accessed Aug. 28, 2009, 4 pages.

Wu, et al. "Blind adaptive beamforming for cyclostationary signals," IEEE Trans. Signal Process., 44(11), Nov. 1996, pp. 2757-2767. Last accessed Aug. 28, 2009, 11 pages.

Lv, et al. Interference Detection Using Preambles for Sensing. IEEE 802.22-07/0032r0 Wireless RANs, Jan. 13, 2007, Huawei. Last accessed Aug. 31, 2009, 15 pages.

MacKay. "Fountain codes," IEE Proc. Commun., 152 (6), Dec. 2005, 1062-1068. IEE Proceedings online No. 20050237, Paper received May 23, 2005, 7 pages.

Letaief, et al. Cooperative Spectrum Sensing. In E. Hossain, V. Bhargava (Eds), Cognitive Wireless Communication Networks, Springer, Berlin, 2007, 115-138, last accessed Aug. 31, 2009.

M. Ghozzi, et al. Cognitive radio: methods for the detection of free bands. C. R. Physique 7 (2006) 794-804, available online Sep. 8, 2006. Last accessed Aug. 31, 2009, 11 pages.

Du, et al. A Class of Adaptive Cyclostationary Beamforming Algorithms. Circuits Syst Signal Process (2008) 27: 35-63, Jan. 2008, pp. 35-63. Published online: Jan. 4, 2008.

D. Cabric and R. Brodersen, "Robust spectrum sensing techniques for cognitive radio networks," in F. H. P. Fitzek and M. D. Katz (eds.), Cognitive Wireless Networks, 2007 Springer, 373-394.

K.-L. Du and M. N. S. Swamy, Neural Networks in a softcomputing Framework, Springer, London, 2006.

W. A. Gardner, Statistical Spectral Analysis: An Nonprobabilistic Theory, Prentice-Hall, Englewood Cliffs, New Jersey, 1987.

W. A. Gardner, Cyclostationarity in Communications and Signal Processing, IEEE Press, New York, 1994.

* cited by examiner

EXPLOITING MULTIPLE ANTENNAS FOR SPECTRUM SENSING IN COGNITIVE RADIO NETWORKS

RELATED APPLICATION

This patent application is a continuation application of U.S. patent application Ser. No. 12/425,754, filed Apr. 17, 2009, and entitled "EXPLOITING MULTIPLE ANTENNAS FOR SPECTRUM SENSING IN COGNITIVE RADIO NETWORKS," the entirety of which patent application is incorporated herein by reference.

TECHNICAL FIELD

The present disclosure relates generally to wireless communications systems, and more particularly to spectrum sensing for cognitive radio networks.

BACKGROUND

Frequency bands for wireless communications are divided among primary users (PU), which are licensed to use a certain spectrum for a given purpose. For example, cellular networks are allocated a portion of a frequency band for wirelessly transmitting and receiving communication signals, as are frequency modulation (FM) radio stations, television stations, amateur radio, and/or the like. Such partitioning ensures different types of signals can be simultaneously communicated without substantial interference from other sources. The signals can be transmitted in an effort to provide beneficial communication services to one or more users. In many cases, the technologies are allocated large portions of frequency bands. Due to technological limitations (such as signal power), device location, usage patterns, required bandwidth, etc., portions of given frequency bands may be inefficiently utilized and/or wasted. For example, in rural areas, much of frequency bands reserved for FM radio stations can go unutilized as transmitters are more sparsely deployed as compared to urban areas.

In this regard, cognitive radio (CR) technology has evolved, which enables wireless communications over unused portions of the frequency bands. Because use of reserved frequency bands can vary over time, CRs possess a cognitive capability to determine frequencies that are unutilized, as well as an ability to reconfigure parameters to communicate over the unutilized frequencies. The cognitive capability cycle can include spectrum sensing (e.g., radio signal analysis, channel identification, etc.), cognition/management (e.g., dynamic spectrum management, routing, quality-of-service provisioning, etc.), and control action (e.g., transmit-power control, adaptive modulation and coding, rate control, etc.).

Spectrum sensing is used to detect presence of a PU related to a frequency band; if the PU is sufficiently sensed, then the CR might not utilize the related spectrum. Sensing can be performed based on energy detection, which facilitates determining whether the frequency band is utilized; however, energy detection does not allow identification of a user occupying the frequency band. Sensing can also be performed using matched filtering; however, this requires prior knowledge of details related to the system for which the spectrum is reserved as well as synchronization thereto, which can be complex. Sensing can also be performed using feature detection where standards specifics of the related technology can be identified in a signal to determine whether the signal relates to the PU technology. Feature detection, however, is highly complex to implement and operate.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Spectrum sensing techniques that utilize cyclostationary beamforming to determine a signal of interest (SOI) from an antenna array measurement are provided. This can be accomplished by utilizing adaptive cross self-coherent restoral (ACS), in one example. Based on analyzing the SOL it can be determined whether a related communication channel is occupied by a primary user (PU), secondary user (SU), or vacant. When occupied by a PU, the channel can be deemed unavailable for communication, whereas if the channel is occupied by a SU or is vacant, it can be utilized for communication, in one example. In addition, for example, the antenna array can be measured while simultaneously transmitting signals over one or more frequencies so long as the transmitted signals have a different cycle (or conjugate cycle) frequency. Moreover, the spectrum sensing techniques described herein can be utilized in cognitive radios (CR) communicating over a wireless network to determine one or more spectrums over which communication is allowed.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

DETAILED DESCRIPTION

Figure 1:
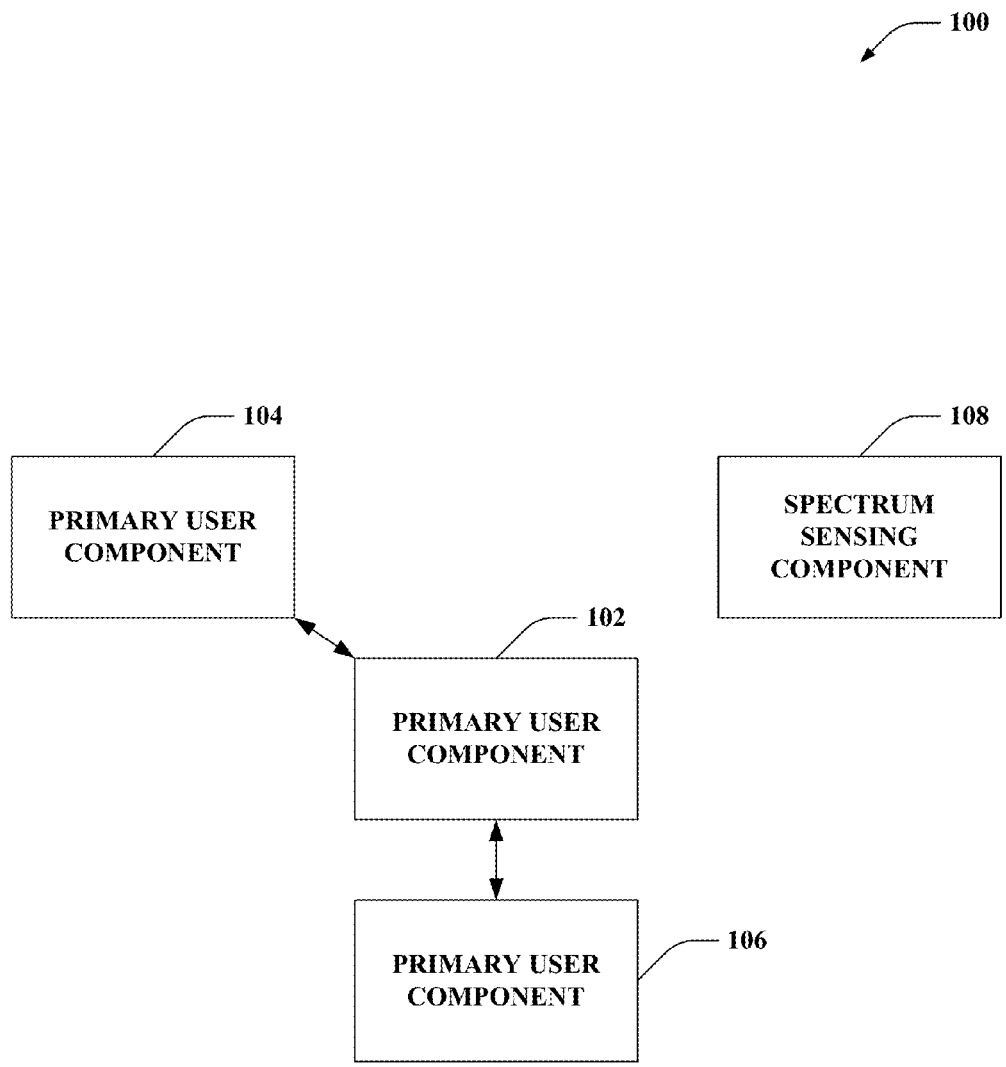
FIG. 1 illustrates a high-level block diagram of an example system that can spectrum sense in a wireless communication environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Additionally, while aspects of the present disclosure are generally described in relation to cognitive radio (CR) communication, it is to be appreciated that the subject matter described herein can be utilized in substantially any environment for detecting utilized or unutilized frequency bands in wireless communications.

Referring to FIG. 1, a high-level block diagram of an example wireless communication system 100 in accordance with various aspects presented herein is illustrated. The wireless communication system includes a plurality of communicating primary user (PU) components 102-106. For example, the PU components 102-106 can utilize a portion of a frequency band to communicate. The portion of the frequency band can be defined herein as substantially any number of frequency band resources over time and/or divisions thereof, such as channels, resource blocks, resources, orthogonal frequency division multiplexing (OFDM) symbols, tiles, tones, subcarriers, and/or the like. In addition, the terms are used interchangeably herein such that, for example, channels can refer to substantially any defined collection of frequency band portions over a collection of time periods. Such collections or portions can be defined in a communication specification for PUs and/or SUs, and/or the like. In one example, the PU components 102-106 can be configured in a broadcast mode, request/receive, peer-to-peer, and/or the like. Thus, for instance, PU component 102 can be an access point or broadcast tower, etc., and PU components 104 and 106 can be receivers or transmitters, etc., that can receive data from the PU component 102 and/or transmit data thereto. In addition, though not shown, PU component 104 can additionally or alternatively communicate with PU component 106 and/or vice versa.

The portion of the frequency band utilized for communication can be reserved for the PU components 102-106. In one example, the spectrum can be reserved by a government agency (such as the Federal Communications Commission (FCC), etc.), standards organization, and/or the like. The frequency band, however, can be utilized by other secondary devices as well, in one example, such as a CR, devices communicating therewith, and/or other devices. This can be mandated by the same government agency, standards organization, etc., in one example. Secondary devices, however, can determine whether a portion of the frequency band is currently utilized by a PU to avoid interfering with the primary reserved use and/or avoid receiving interference from the PUs as part of the mandate.

For this reason and other cases where determining utilized and unutilized frequency bands is beneficial, a spectrum sensing component 108 is also provided that can detect presence of communication over a frequency band and/or identify whether the communication is by PUs, secondary users (SU), etc. As described further below, the spectrum sensing component 108 can determine one or more signals of interest (SOI) from an antenna array measurement related to the various PU components 102-106. The spectrum sensing component 108 can further determine whether a related communication channel is occupied by a PU, SU, or is vacant based at least in part on the SOIs. In one example, as described further herein, the spectrum sensing component 108 can utilize cyclostationary beamforming to acquire the SOI, and determine a source of the SOI as a PU, SU, or other noise based on detecting one or more mainlobes and/or sidelobes in the SOI. Cyclostationary beamforming can refer to extracting a signal (e.g., as a single beam) from a frequency band at a unique cycle frequency. For example, a mainlobe refers to a largest lobe in the frequency band, and a sidelobe refers to a lobe in the spectrum that is not the mainlobe. In an example, the cyclostationary beamforming can be implemented according to a self-coherent restoral (SCORE) algorithm, such as adaptive cross-SCORE (ACS), adaptive phase-SCORE (APS), least squares SCORE (LS-SCORE), cross-SCORE, auto-SCORE, cyclic adaptive beamforming (CAB), adaptive CAB (ACAB), and/or the like.

In one example, detection of whether the spectrum is currently occupied by a PU can be stated by a binary hypothesis test. A null hypothesis $H_0$ corresponds to the absence of a signal, and a hypothesis $H_1$ corresponds to the presence of a signal. The signal received by the spectrum sensing component 108, x(t), can be given by $$x(t) = \begin{cases} w(t), & H_0 \\ hs(t) + w(t), & H_1 \end{cases}$$

where s(t) is the PU signal, h is the amplitude gain of the channel, and w(t) is the additive white Gaussian noise (AWGN) with zero mean and variance $\sigma_n^2$. Given a decision statistic d, the probabilities of detection $P_d$, false alarm $P_{fa}$, and missed alarm $P_m$ are, respectively, given by $$P_d = E[Pr(H_1|H_1)] = Pr(d > d_{th}|H_1)$$

$$P_{fa} = E[Pr(H_1|H_0)] = Pr(d > d_{th}|H_0)$$

$$P_m = E[Pr(H_0|H_1)] = 1 - P_d$$

where $d_{th}$ is a threshold level, which can be calculated from a specified $P_{fa}$. Naturally, $P_{fa}$ is independent of the signal to noise ratio (SNR), since under the $H_0$ hypothesis there is no PU signal present. Conversely, $P_d$ is dependent on the SNR of the received signal as well as the channel conditions.

From the incumbent protection point of view, a higher $P_{fa}$ is more tolerable than a lower $P_d$. For example, in Institute of Electrical and Electronics Engineers (IEEE) 802.22, $P_d=0.9$ is chosen for the SNR of −20 dB. Note that if the PUs require 100% protection in its frequency band, SUs cannot communicate in that frequency band. In view of the above formulas and considerations, the spectrum sensing component 108, which can be related to a SU, can detect occupancy and identity of one or more SOIs, as described further herein. As mentioned, the detection can be based at least in part on evaluating one or more cyclostationary properties of the SOIs in view of the formulas and/or considerations. In addition, in one example, the spectrum sensing component 108 can perform such detection while wirelessly transmitting signals.

Figure 2:
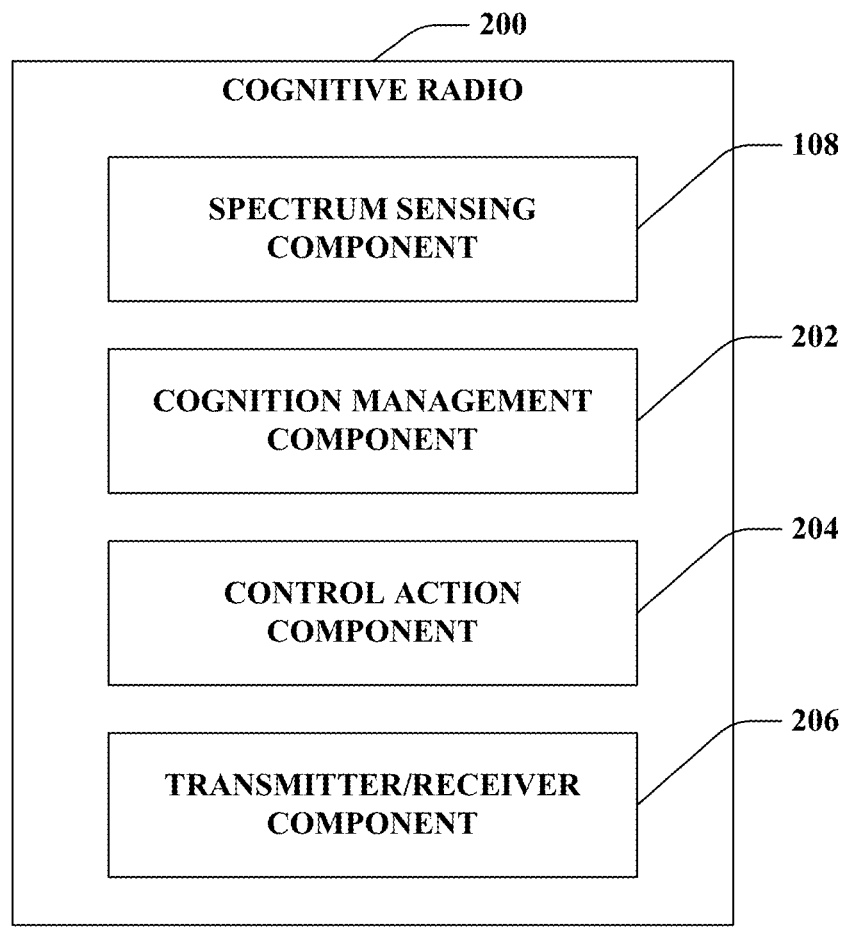
FIG. 2 illustrates a block diagram of an example cognitive radio employing spectrum sensing as described herein.

Turning to FIG. 2, a block diagram of an example CR 200 in accordance with various aspects is illustrated. The CR 200, as described, can be employed in a variety of environments where it can communicate with various devices in frequency bands reserved for disparate devices communicating using disparate technologies, such as PUs of the frequency band. In this regard, the CR 200 can communicate in portions reserved for but not utilized by surrounding PUs to provide efficient use of spectrum resources. To this end, the CR 200 comprises a spectrum sensing component 108 that analyzes frequency bands to determine existence and/or identification of PUs communicating over the spectrums, a cognition management component 202 that selects resources over the frequency band for communication based at least in part on determined existence/identifications of PUs by the spectrum sensing component 108, a control action component 204 that communicates over the selected resources and/or notifies other devices or radios that it is utilizing the selected resources, and a transmitter/receiver component 206 that facilitates communicating with one or more disparate CRs or other wireless devices.

In one example, the spectrum sensing component 108 can determine one or more resources of a frequency band over time that are reserved for but not being utilized by a PU. Based on this information, the cognition management component 202 can select the one or more resources for communicating with disparate CRs (not shown) or other devices using dynamic spectrum management and/or the like. It is to be appreciated that the cognition management component 202 can additionally provide quality-of-service provisioning at the transmitter/receiver component 206. In another example, the disparate CRs or other devices can determine the resources and notify the CR 200 to utilize the resources to communicate with the disparate radio or device. The control action component 204 can facilitate communicating with disparate radios or devices over the resources of frequency band in view of the above, for example. In addition, the control action component 204 can provide transmit-power control (TPC), adaptive modulation and coding (AMC), rate control, etc., at the transmitter/receiver component 206 or related components.

It is to be appreciated that resources of frequency band not being utilized by the PU can subsequently become utilized by the PU. In this case, the cognition management component 202 can detect interference from the PU and cause the spectrum sensing component 108 to determine other resources of the same or a different spectrum for communicating. The control action component 204 can accordingly utilize the determined resources and/or notify one or more disparate CRs of the switch in resources. In addition, as described further herein, the transmitter/receiver component 206 can communicate with one or more disparate devices while the spectrum sensing component 108 simultaneously measures the frequency band, so long as the transmitted signal has a different cycle (or conjugate cycle) frequency.

Spectrum sensing functionality in the spectrum sensing component 108 can be divided into two subtasks: occupancy sensing and identity sensing. Spectrum sensing schemes performed by the spectrum sensing component 108 can be either reactive or proactive, depending on how they search for white spaces (e.g., unused frequency bands). Reactive schemes can operate on an on-demand basis where the CR 200, or one or more related components, starts to sense the spectrum only when it has some data to transmit. Proactive schemes, on the other hand, can minimize realized delay of the spectrum sensing component 108 by finding an idle band through maintaining a list of licensed bands currently available for opportunistic access through periodic spectrum sensing at the spectrum sensing component 108.

In one example, the spectrum sensing component 108 can utilize radio signal analysis to detect and/or identify a user of frequency band resources. For radio signal analysis, modulation recognition and bit stream analysis can be applied to identify whether an alarm (e.g., a detected signal) corresponds to a PU, or a SU, or noise (e.g., false alarm). Modulation recognition can be necessary for the selection of a suitable demodulation process at the receiver. Knowledge of the types of service operating on a channel can assist the decision of jumping channels in a way which minimizes overhead to the CR 200 and its impact on the PUs of the spectrum. Also, the cognition management component 202 can recognize other CRs on the link channel to prevent sensing one another as PUs and accordingly jumping frequencies.

In one example, the spectrum sensing component 108 can extract a number of features to identify the type of the PUs from the received data using signal processing techniques. These features can be frequency-domain features (e.g., bandwidth, center frequency, single carrier versus multi-carrier), time-domain features (e.g., maximum duration of a signal, multiple-access technique, duplexing technique, frame duration, spreading codes or hopping patterns), and/or the like. Some or all of the features can be extracted from the received data and used for classification. The spectrum sensing component 108 can identify the PUs by using the a priori information about related transmission parameters. In this regard, the spectrum sensing component 108 can employ a classifier, such as the optimal Bayesian classifier, a neural network classifier, and/or the like. A classifier can be trained off-line, but the recognition process can be performed online by the spectrum sensing component 108 on the incoming signal at an affordable complexity.

Spectrum management functions address four major challenges: spectrum sensing, spectrum decision, spectrum sharing, and spectrum mobility. Spectrum mobility allows a CR to exchange its frequency of operation in a dynamic manner by allowing the CRs to seamlessly operate in the best available frequency band. Spectrum sharing deals with fair spectrum scheduling, which is a media access control (MAC) functionality. The spectrum sensing component 108 of the CR 200, as described, can to maintain an up-to-date list of available channels within a band. The channel usage database can also be used to avoid the occupied licensed channels, and the cognitive management component 202 can estimate its position and check a database to find out which channels are vacant in its vicinity.

The cognitive management component 202 selects a set of subchannels from the PU band to establish a SU link that adapts itself in accordance with the PU spectral activity on that band. The CR 200 is required to vacate a subchannel as soon as a PU becomes active on that subchannel. This causes the CR 200 to lose packets on that subchannel. To compensate for this loss, the transmitter/receiver component 206 can utilize a class of erasure correction codes called LT (Luby transform) codes or digital Fountain codes for packet-based channels with erasures before transmitting SU packets on these subchannels, for example. This can provide packet-level protection at the transport layer or higher, augmenting the bit-level protection that may be provided by the MAC and physical layers.

Figure 3:
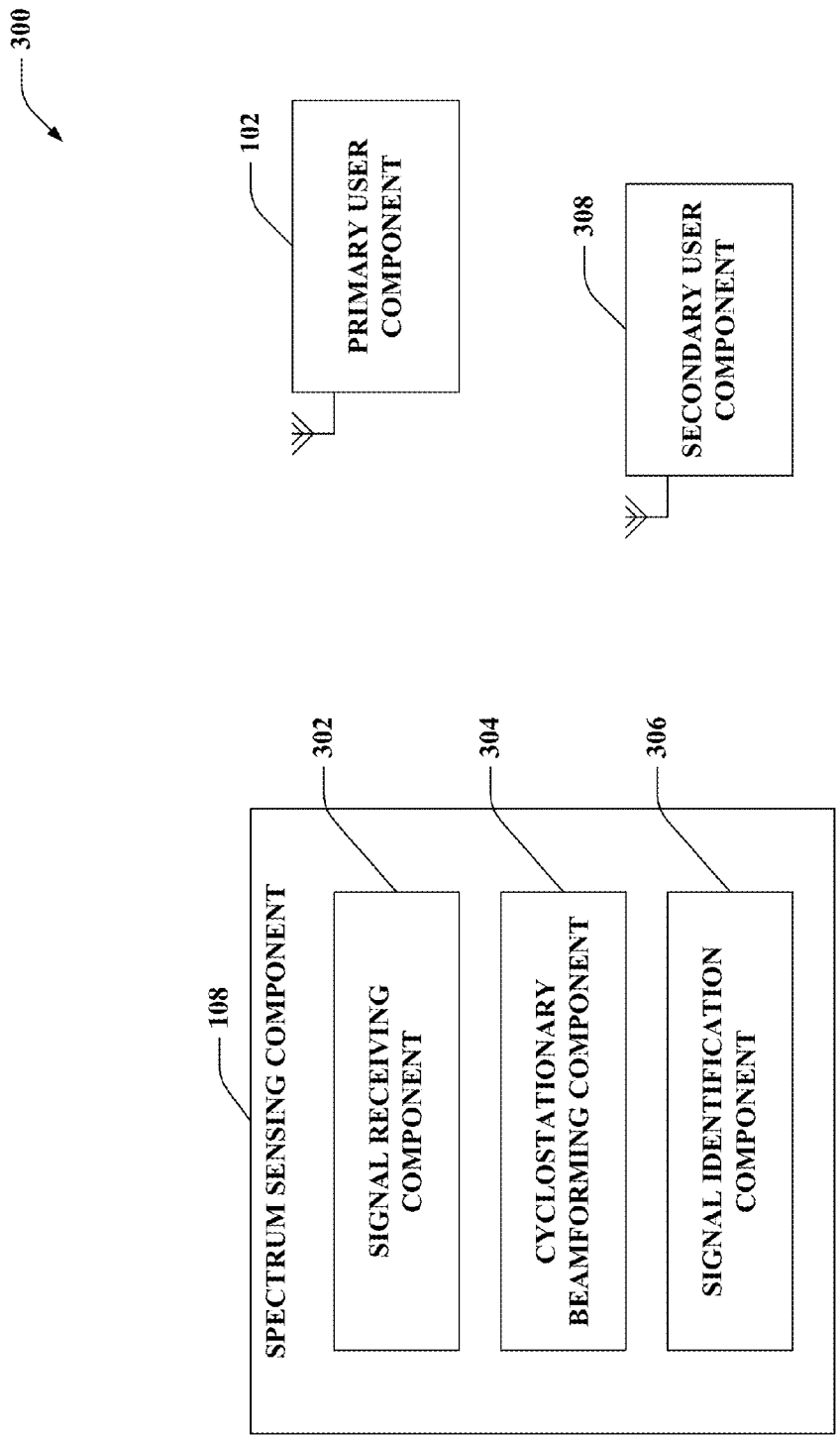
FIG. 3 illustrates a block diagram of an example system for spectrum sensing presence of a primary and/or secondary user.

Turning to FIG. 3, a block diagram of an example system 300 for evaluating frequency bands for SU communication is shown. In particular, a spectrum sensing component 108, as described herein, is provided comprising a signal receiving component 302 that receives one or more signals over a portion of a frequency band in a wireless communications environment, a cyclostationary beamforming component 304 that calculates a signal from the portion of the frequency band by using a cyclostationary beamforming algorithm, and a signal identification component 306 that detects a source of a signal in the portion of the frequency band. In addition, a PU component 102 is shown that communicates over an assigned frequency band or portion thereof along with a SU component 308 that communicates in the same frequency band, or portion thereof, during time intervals when the PU component 102 is not communicating and/or on frequencies within the spectrum, but adjacent to those utilized by the PU component 102.

According to an example, the signal receiving component 302 can obtain one or more signals over a frequency band, or portion thereof, which can have been transmitted by the PU component 102 and/or SU component 308. The one or more signals can be received as a result of the signal receiving component 302 measuring an antenna array. In one example, as described, this measurement can be performed to determine whether the frequency band or related portion can be utilized for communicating by a CR or other SU device related to the spectrum sensing component 108. The cyclostationary beamforming component 304 can extract a SOI from the antenna array measurement using cyclostationary beamforming, in one example. A cyclostationary beamforming algorithm, such as ACS, can analyze a unique cycle frequency, which can be determined based on a carrier frequency, symbol rate, and/or other signal properties. In this regard, the cycle frequency can be communicated to the cyclostationary beamforming 304 based on one or more known specifications related to PUs of the frequency band, discerned from patterns of signals received over the frequency, specified by one or more disparate devices or components, and/or the like.

For example, man-made modulated signals can be coupled with sinewave carriers, pulse trains, coding, repeating spreading, hopping sequences or cyclic prefixes, resulting in built-in periodicity. These modulated signals are characterized as second-order cyclostationary if their mean and autocorrelation display periodicity. For cyclostationary signals, non-overlapping frequency bands are uncorrelated, and further, the inherent periodicity implies some spectral redundancy, which results in correlation between non-overlapping spectral components separated by some multiple of the cycles.

In the time domain, a second-order cyclostationary process is a random process for which the statistical properties (namely, the mean and autocorrelation) change periodically as functions of time, with a period T.

$$m_x(t)=m_x(t+T)\forall t$$

$$R_{xx}(t_1,t_2)=R_{xx}(t_1+T,t_2+T)\forall t_1,t_2$$

Since $R_{xx}(t_1,t_2)$ is periodic, it has a Fourier-series representation. By denoting $$t_1 = t+\frac{\tau}{2} \text{ and } t_2 = t-\frac{\tau}{2},$$

such a Fourier series is as follows $$R_{xx}\left(t+\frac{\tau}{2}, t-\frac{\tau}{2}\right) = \sum_\alpha R_{xx}^\alpha(\tau)e^{j2\pi\alpha t}$$

where the Fourier coefficients are $R_{xx}^\alpha(\tau)$, which is called the cyclic autocorrelation function or spectral correlation function, and $\alpha$ is known as the cycle frequency. A communication signal received by the signal receiving component 302 can have cycle frequencies that are related to the carrier frequency, the symbol rate and its harmonics, the chip rate, guard period, the scrambling code period, and the channel coding scheme, for example.

A scalar waveform $x(t)$ is said to be spectrally self-coherent (or conjugate self-coherent) at a frequency $\alpha$, if the spectral correlation function, that is, the correlation between $x(t)$ and $x(t)$ shifted in frequency by $\alpha$, is nonzero for some delay $\tau$ $$R_{xx(*)}^\alpha(\tau) = \left\langle x\left(t+\frac{\tau}{2}\right)[x^*]^{(*)}\left(t-\frac{\tau}{2}\right)e^{-j2\pi\alpha t}\right\rangle_\infty \neq 0$$

where * is the conjugate operator, the optional conjugation (*) is applied in the conjugate self-coherence case, $\langle\cdot\rangle_\infty$ denotes infinite time-averaging, j is the imaginary number, and $\alpha$ is the non-conjugate or conjugate cycle frequency. If a signal is cyclostationary with period T, then cyclic autocorrelation has a component at $\alpha=1/T$. For stationary signals, $R_{xx(\cdot)}^\alpha=0$ for any $\alpha \neq 0$.

As mentioned, the cyclostationary beamforming 304 can utilize a cyclostationary beamforming algorithm to detect signals present in a frequency band or portion thereof. Some examples of such algorithms include LS-SCORE, cross-SCORE, auto-SCORE, etc., as described. In an example, however, the cyclostationary beamforming 304 uses an ACS algorithm to perform cyclostationary beamforming, extracting a number of signals from co-channel interference with only knowledge of cycle frequencies thereof, which can be assumed to be different. In addition, the ACS algorithm is applicable to cyclostationary and conjugate cyclostationary signals.

For narrowband signals, when an antenna array is excited by a SOI $s(t)$, background noise, and co-channel interference, the received signal at the array, which can include signals from the PU component 102 and/or SU component 308, can be expressed as $$x=ds(t)+i(t)$$

where d is the steering vector of the SOI, and $i(t)$ is the sum of the interfering signals and the background noise. Assume that $s(t)$ is spectrally self-coherent at $\alpha$, and that $i(t)$ is not spectrally self-coherent at $\alpha$ and is temporally uncorrelated with $s(t)$. The beamformer is defined as $$y(t)=w^H x(t)$$

where w is the beamforming weight and $y(t)$ is the extracted SOI. A reference signal $r(t)$ is defined as $$r(t)=c^H u(t)$$

where c is a control vector, and $u(t)$ is $x^{(*)}(t)$ shifted in frequency by $\alpha$ and in time by $\tau$ $$u(t)=x^{(*)}(t-\tau)e^{j2\pi\alpha}$$

The ACS algorithm optimizes the same objective as the cross-SCORE algorithm does, but implements in a different way. It maximizes the strength of the spectral cross-correlation (or conjugate cross-correlation) coefficient $\rho_{yr}^{\alpha}$ between the beamformer output y(t) and the reference signal r(t)

$$w, c = \underset{w,c}{\operatorname{argmax}} |\hat{\rho}_{yr}^{\alpha}(\tau)|^2 = \frac{|w^H \hat{R}_{xu} c|^2}{[w^H \hat{R}_{xx} w][c^H \hat{R}_{uu} c]}$$

where $\hat{R}_{xu}$, $\hat{R}_{xx}$, $\hat{R}_{uu}$ are the estimated correlation matrices. This can be transformed into maximizing the numerator while fixing the denominator, that is, $$w, c = \underset{w,c}{\operatorname{argmax}} |w^H \hat{R}_{xu} c|^2$$

s.t.

$$w^H \hat{R}_{xx} w = 1, c^H \hat{R}_{uu} c = 1$$

By applying the Lagrange multiplier method and implementing some manipulation, $$\lambda w = \hat{R}_{xx}^{-1} \hat{R}_{xu} c$$

$$\lambda c = \hat{R}_{uu}^{-1} \hat{R}_{xu} w$$

Unlike the cross-SCORE that searches the dominant mode at each sample, the ACS solves one eigenvalue problem for all the samples. This substantially reduces the total number of complex multiplications from $(6.75n^2+4.25n)m$ to $6.75n^2+4.25n$ for each sample, where m is the number of iterations needed for solving the eigenvalue to a specified accuracy for each sample of the cross-SCORE algorithm. For slow fading channels, the ACS algorithm is given by $$w(k) = \hat{R}_{xx}^{-1}(k) \hat{R}_{xu}(k) c(k-1)$$

$$w(k) = \frac{w(k)}{\|w(k)\|}$$

$$c(k) = \hat{R}_{uu}^{-1}(k) \hat{R}_{ux}(k) w(k)$$

where $$\hat{R}_{xu}(k) = \frac{k-1}{k} \left[ \hat{R}_{xu}(k-1) + \frac{1}{k-1} x(k) u^H(k) \right]$$

$$\hat{R}_{ux}(k) = \hat{R}_{xu}^H(k)$$

$$\hat{R}_{xx}^{-1}(k) = \frac{k}{k-1} \left\{ \hat{R}_{xx}^{-1}(k-1) - \frac{\hat{R}_{xx}^{-1}(k-1) x(k) x^H(k) \hat{R}_{xx}^{-1}(k-1)}{(k-1) + x^H(k) \hat{R}_{xx}^{-1}(k-1) x(k)} \right\}$$

$$\hat{R}_{uu}^{-1}(k) = \left[ \hat{R}_{xx}^{-1}(k) \right]^{(*)}$$

By specifying $\hat{R}_{xx}^{-1}(1)$, the iteration can proceed. $\hat{R}_{xx}^{-1}(1)$ can be selected by averaging M snapshots of the frequency band, received by the signal receiving component 302, ($M > n_a$), $n_a$ being the number of antenna elements, $$R_{xx}(1) = \frac{1}{M} \sum_{-M+2}^{1} x(i) x^H(i),$$

and $R_{xx}^{-1}(1) = [R_{xx}^{-1}(1)]^{-1}$. The performance of a beamformer is characterized by the output signal-to-interference-plus-noise ratio (SINR)

$$SINR = \frac{w^H d R_{ss} d^H w}{w^H R_I w}$$

where $R_{ss}$ is the autocorrelation or the average power of the SOI s(t) and R is the autocorrelation of the summed interference and noise. The cyclostationary beamforming 304 can use the above algorithm to output beamformed cyclostationary signals, from a frequency band, for evaluation and/or identification thereof.

For example, in a typical CR application, modulation parameters such as the carrier frequencies, data rates, and bandwidths of the possible channels for PU signals (e.g., from PU component 102) are defined in a standard and can be known by CRs, as described with respect to the cognition management component 202 in previous figures. Each class of CR may also know such modulation parameters of other classes (e.g., other CRs, such as SU component 308). Typically, the transmission channels can be specified as $$f_c = f_0 + \left( n - \frac{1}{2} \right) B, n = 1, 2, \ldots, N$$

where $f_0$ is the start frequency of the band, B is the bandwidth of each channel, and N defines the number of channels. This is also applicable for OFDM signals. One or more co-channel signals may be present on each channel, as in the spread-spectrum communication scenarios. A CR can be required to find a vacant channel with the carrier frequency $f_c$ and the bandwidth B (e.g., utilizing a spectrum sensing component 108, as shown) before accessing the network. The spectrum sensing component 108 can test all the channels for the presence of transmission. The cyclostationary beamforming 304 can be leveraged, in this regard, to perform the following procedure for beamforming cyclostationary signals.

ŷ(k) = ACS (α, opmode, N_samples, x(k))
Input:    α – non-conjugate or conjugate cycle frequency
          opmode – non-conjugate or conjugate cyclostationary mode
          N_samples – number of samples
          x(k) – samples at the antennas
Output:  ŷ(k) – beamforming output
begin procedure
    $\alpha_n := \alpha/f_s, \tau_n := 0$ $$R_{xx}(0) := \frac{1}{M} \sum_{-M+1}^{0} x(i) x^H(i)$$

$R_{xx}^{-1}(0) := [R_{xx}(0)]^{-1}$
    $\hat{R}_{xu}(0) := 0$
    c(0) := rand (L, 1)
    for k to N_samples,
        $u(k) := x^{(*)}(k - \tau_n) e^{j2\pi\alpha_n k}$ $$\hat{R}_{xu}(k) := \frac{k-1}{k} \left[ \hat{R}_{xu}(k-1) + \frac{1}{k-1} x(k) u^H(k) \right]$$

$\hat{R}_{ux}(k) := \hat{R}_{xu}^H(k)$

-continued $$\hat{R}_{xx}^{-1}(k) := \frac{k}{k-1}\left\{\hat{R}_{xx}^{-1}(k-1) - \frac{\hat{R}_{xx}^{-1}(k-1)x(k)x^H(k)\hat{R}_{xx}^{-1}(k-1)}{(k-1) + x^H(k)\hat{R}_{xx}^{-1}(k-1)x(k)}\right\}$$

$$\hat{R}_{uu}^{-1}(k) := [\hat{R}_{xx}^{-1}(k)]^{(*)}$$
$$w(k) := \hat{R}_{xx}^{-1}(k)\hat{R}_{xu}(k)c(k-1)$$

$$w(k) := \frac{w(k)}{\|w(k)\|}$$

$$c(k) := \hat{R}_{uu}^{-1}(k)\hat{R}_{ux}(k)w(k)$$
$$\hat{y}(k) := w^H(k)x(k)$$
end for
end procedure It is to be appreciated that other procedures are possible including variations of the above. In one example, the cyclostationary beamforming 304 can perform substantially any procedure that beamforms cyclostationary signals, as described above.

Based at least in part on output from the cyclostationary beamforming 304, the signal identification component 306 can detect sources of the output signals according to various mechanisms, such as learning, determining or receiving features present in such signals. In one example, the signal identification component 306 can detect the signal sources according to the following procedure. It is to be appreciated that 1e6 in the procedure can be substantially any sufficiently large number, in one example.

The threshold $d_n$ can be defined as several times the noise band in the channel. To differentiate between signals from the PU component 102 and SU component 308, their respective conjugate or non-conjugate cycle frequencies can be selected to be different. Most other existing spectrum sensing techniques perform in-band sensing and measurement during the specified quiet periods in order to avoid interference from the network itself. Using the above procedure, the cyclostationary beamforming 304 and signal identification component 306 can measure while a related CR is transmitting, as described, so long as the transmitted signal does not have the same cycle frequency.

The above procedure is also advantageous over spectrum cyclic analysis-based detection approaches, since the latter has a much higher complexity due to computation of the spectrum cyclic density (SCD) function. In spectrum cyclic analysis-based approaches, for example, detection of the specific feature requires sufficient over-sampling and minimum resolution in both frequency and cycle domains. The signal has to be over-sampled in the cycle domain such that the Nyquist rate for maximum resolvable cycle frequencies is satisfied. The resolutions in frequency and cycle domains are improved by observing the signal over a long period of time, that is, over many symbol periods. Search for the peaks on the SCD function is also computationally complex. For the above procedure, since the modulation and coding of the PU component 102 and SU component 308 signals have been defined in their standards, the cycle frequencies for each PU component 102 and SU component 308 mode on each channel are

```
begin procedure
    for n = 1 to N (all possible channels)
        for l = 1 to N_PU (all PU modes)
            isHole := 0; isPU := 0; isSU := 0;
            Set cycle frequency for PUs, α_PU
            Call procedure ACS (above), and extract the SOI ŷ(k) at α_PU.
            Calculate the power spectrum of ŷ using FFT.
            Test the occupancy of channel n by analyzing the power spectrum:
                if there is a mainlobe in channel n ,
                    channel n is occupied as a PU signal in mode l .
                    isPU := isPU + 1e6; (occupied by PU)
                    break;
                elseif there is no lobe in channel n (for threshold d_n ),
                    isHole := isHole + 2;
                elseif there is a lobe in channel n and other lobes in other channels,
                    Test SU signals in channel n :
                    for m = 1 to M (all possible SU types)
                        Set α_SU;
                        Call procedure ACS, and extract the SOI ŷ'(k) at α_SU;
                        Calculate the power spectrum of ŷ'(k) ;
                        Test the power spectrum:
                            if there is a mainlobe in channel n ,
                                isSU := isSU + 1e6; (occupied by SU)
                                break;
                            elseif there is no lobe in channel n (for threshold d_n ),
                                isHole := isHole + 2;
                            else
                                isHole := isHole+1; isPU := isPU+2;
                            end if
                    end for
                end if
                if (isPU>isSU) and (isPU>isHole),
                    channel n is occupied by a PU;
                elseif (isSU>isPU) and (isSU>isHole),
                    channel n is occupied by a SU;
                else
                    channel n is a hole;
                end if
        end for
    end for;
end procedure
``` known and usually are designed to be unique, if the channel is occupied by PU component 102, CR, or other SU component 308. The detection depends on the ACS algorithm utilized by the cyclostationary beamforming 304 and the extracted SINR, as shown above.

Figure 4:
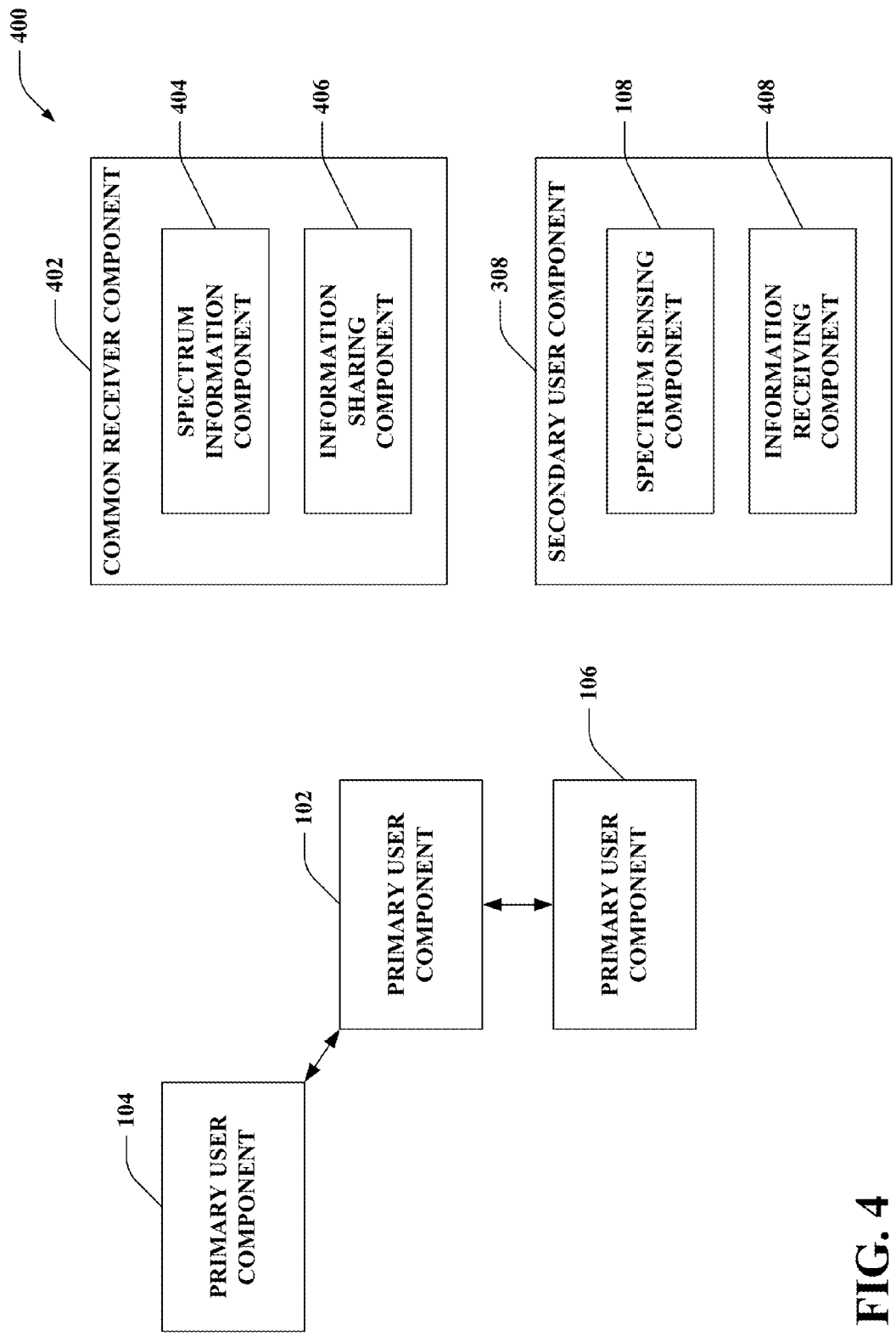
FIG. 4 illustrates a block diagram of an example system that facilitates cooperative spectrum sensing.

Referring to FIG. 4, an example system 400 that facilitates cooperative spectrum sensing is illustrated. PU components 102-106 are provided that communicate over a reserved frequency band, or portion thereof, as described. In addition, a SU component 308, which can be a CR, a stationary device, and/or the like, is shown. The SU component 308 comprises a spectrum sensing component 108 that determines portions of the frequency band over which the PU components 102-106 and/or other components are not communicating, as described. A common receiver component 402 is also provided that comprises a spectrum information component 404 that receives spectrum information from one or more CRs or other SU components and an information sharing component 404 that communicates the unutilized frequency band portions to one or more CRs, SU components, etc. It is to be appreciated that the common receiver component 402 can make independent spectrum measurements, in one example, for transmission using the information sharing component 406. The SU component 308 additionally comprises an information receiving component 408 that can obtain information of one or more unutilized frequency band portions from the information sharing component 406.

In an example, spectrum sensing components 108 of multiple SU components can make a binary decision based on local measurement, and then forward one bit of the decision to the common receiver component 402, where all one-bit decisions can be fused according to an OR logic. In an alternative example, each spectrum sensing component 108 can forward its measurement to the common receiver component 402. A hard decision approach can perform almost as well as a soft decision one in terms of detection performance, but it needs a low bandwidth control channel. To reduce the overhead due to sending the decisions from the information sharing component 406, censoring can be applied by not sending those uncertain decisions. In case that the common receiver component 402 makes final decision on the K binary decisions using an OR rule, the probabilities of false alarm and missing detection for K decisions are derived as $$P_{fa} = Pr(H_1 \mid H_0) = 1 - Pr(H_0 \mid H_0) = 1 - \prod_{i=1}^{K}(1 - P_{fa,i})$$

$$P_m = Pr(H_0 \mid H_1) = \prod_{i=1}^{K} P_{m,i}$$

where $P_{fa,i}$ and $P_{m,i}$ denote the false alarm and miss probabilities of the ith spectrum sensing component 108 in its local spectrum sensing. Assuming that each spectrum sensing component 108 achieves the same $P_{fa,0}$ and $P_{m,0}$, then $P_m = P_{m,0}^K$, and K can be treated as the sensing diversity order, which is provided by the space diversity of the multiple spectrum sensing components 108. The information sharing component 406 can transmit the spectrum information to one or more SU components, such as SU component 308 or other components, CRs, and/or the like. The SU component 308 can receive the spectrum information via the information receiving component 408 and utilize the information in selecting one or more frequency band portions for communicating with other devices.

When a SU component 308 (e.g., CR) is far from a PU, cooperative spectrum sensing allows two SU components 308 to cooperate by treating the SU that is close to the PU as a relay. This achieves a diversity gain arising from relay, which is based on either the amplify-and-forward (AF) or decode-and-forward (DF) cooperative protocol. One of the SU components acts as a relay for the other, resulting in lower outage probabilities. This can effectively combat shadowing and the hidden terminal problem.

When two SU components, such as SU component 308, are in close proximity, they can be used as a virtual antenna array; that is, the measurements of the two SU components are exchanged, and the two SU components then jointly transmit using the Alamouti space-time code to combat fading. Multiuser diversity is a form of selection diversity in which the user with the highest SNR is chosen as the transmission link. Multiuser diversity can be exploited in cooperative spectrum sensing to relay the sensing decision of each SU component to the common receiver component 402. This helps to reduce the reporting error probability, in one example.

Figure 5:
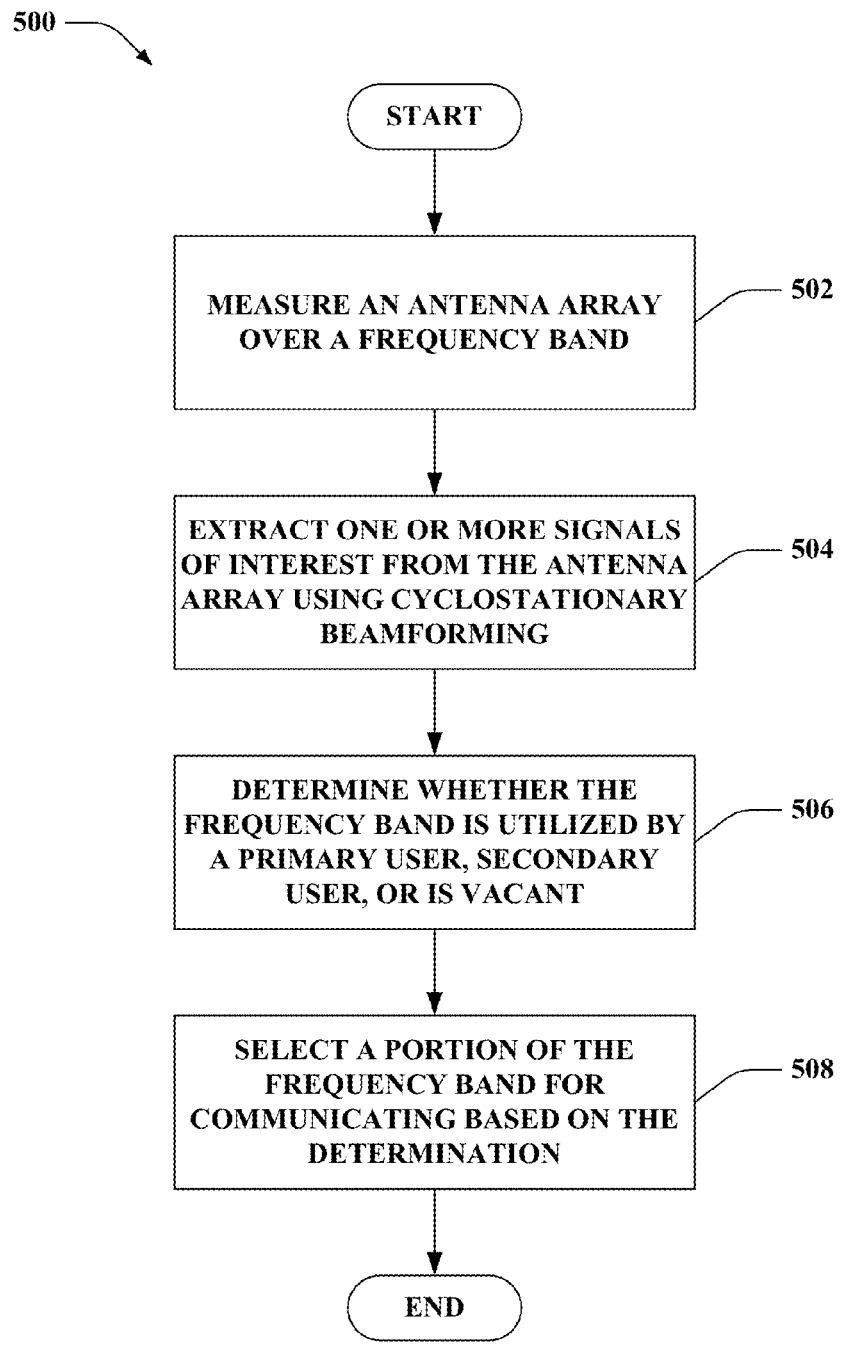
FIG. 5 illustrates an exemplary flow chart for selecting communication frequencies based on spectrum sensing.

Referring now to FIG. 5, a methodology that can be implemented in accordance with various aspects described herein is illustrated. While, for purposes of simplicity of explanation, the methodology is shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodology in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Referring to FIG. 5, a methodology 500 that facilitates sensing one or more devices communicating in a frequency band is illustrated. At 502, an antenna array can be measured over a frequency band. Multiple antennas in the array can receive signals in the frequency band that can be transmitted by various wireless devices (e.g., PUs and SUs, as described). At 504, one or more SOIs can be extracted from the antenna array measurement using cyclostationary beamforming. As described above, the beamforming can be performed using an ACS or other algorithm that outputs beamformed signals. This facilitates enhanced identification of the SOIs, such as by evaluating lobes in the SOIs.

At 506, it can be determined whether the frequency band is being utilized by a PU, SU, or is vacant, based on the one or more SOIs. For example, as described, if the SOI is a conjugate or non-conjugate cycle frequency related to a PU and has a mainlobe, then it can be assumed that a PU is communicating over the related frequency band. If there is a sidelobe, along with other lobes in other channels, then the frequency band can be evaluated to determine if there are mainlobes in the conjugate or non-conjugate cycle frequencies related to the SOIs of known SUs. If there are mainlobes, then it can be assumed that a SU is communicating over the related frequency band. If not, then it can be assumed that the frequency band is vacant, for example. It is to be appreciated that the conjugate or non-conjugate cycle frequencies related to the PU and/or SU can be received from one or more disparate devices, hardcoded according to a specification, and/or the like, as described. At 508, a portion of the frequency band can be selected for communicating based on whether the frequency band is utilized by a PU, SU, or is vacant.

Turning now to FIGS. 6-15, various graphs are depicted presenting simulated results of an example application utilizing an ACS algorithm to detect and/or identify signals in a frequency band. In the graphs, it can be assumed that the entire spectrum is divided into a fixed number of ten channels at carrier frequencies 2001.1, 2002.1, . . . , 2010.1 MHz. A uniform linear array with n=8 antenna elements is used. The spacing between adjacent elements is half the wavelength at the carrier frequency of 2 GHz. The standard deviation of the noise at the array is $\sigma_n^2$=0.1. The signal environment for benchmarking is shown in the table below: there are 5 PU signals representing a primary service, and 2 SU signals representing different CR modes. The sampling rate $f_s$ at the receiver is chosen to be 20 Million samples per second (Msps), and all signals are at the same noise power level $\sigma_s^2$=0.01, and the signal power can be obtained from $$SNR = \frac{p_s}{\sigma_s^2}.$$

The signals are BPSK or 16QAM signals, which are raised-cosine filtered with a roll-off factor of 0.25.

| Signal | Carrier (MHz) | $f_{baud}$/ ($f_s$/20) | Modulation | DoA | SNR (dB) | PU/SU |
|---|---|---|---|---|---|---|
| A | 2001.1 | 1/4 | BPSK | 30° | 15 | PU |
| B | 2002.1 | 1/4 | BPSK | 20° | 25 | PU |
| C | 2006.1 | 1/4 | BPSK | −15° | 30 | PU |
| D | 2007.1 | 1/4 | BPSK | −30° | 10 | PU |
| E | 2008.1 | 1/4 | BPSK | 55° | 20 | PU |
| F | 2005.1 | 1/7 | 16QAM | −40° | 5 | SU |
| G | 2009.1 | 1/11 | 16QAM | 25° | 15 | SU |

For these modulations, the maximum self-coherence occurs at τ=0, and τ=0 is selected. The BPSK signal has conjugate cycle frequency at $\alpha=\pm 2f_c+mf_{baud}$, m=0, ±1, . . . , and has cycle frequency at $\alpha=mf_{baud}$, m=±1, ±2, . . . . In a multiple signal environment, the signals are designed so that their selected cycle frequencies should have a least common multiple that is as large as possible. The 16QAM signal has only non-conjugate cyclostationarity with cycle frequency at $\alpha=mf_{baud}$, m=±1, ±2, . . . . The ACS algorithm can be implemented equally well for both non-conjugate and conjugate cyclostationary signals, depending on the properties of the desired signals.

Figure 6:
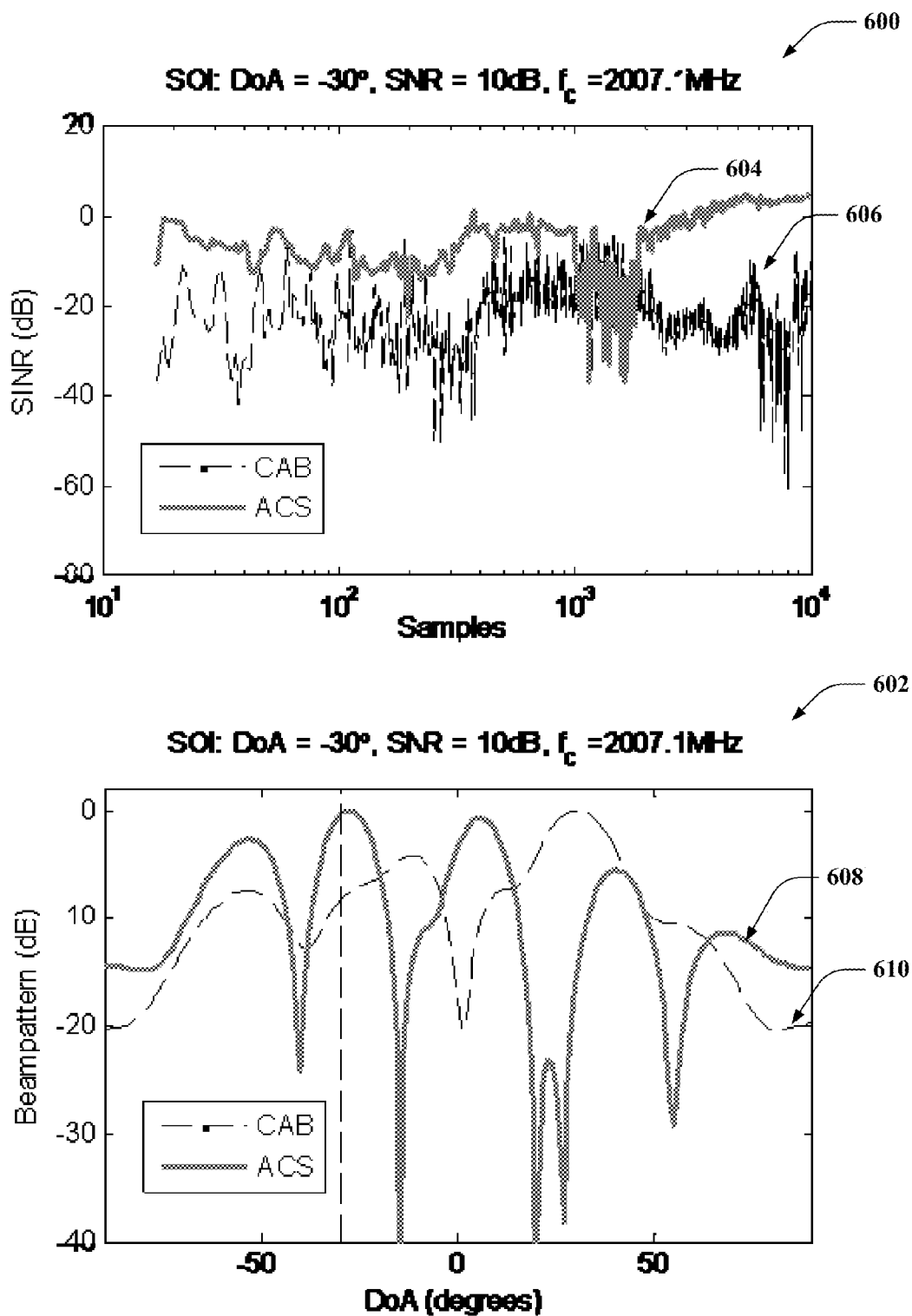
FIGS. 6-15 illustrate exemplary graphs related to performance of spectrum sensing mechanisms described herein.

It is to be appreciated that the SNR of the signal itself has a significant impact on the beamforming algorithms and the noise contained in the signal itself damages the cyclostationary property of the signal. So in FIGS. 6-15, the SNRs of the signals are to be above 5 dB. However, the noise at the receiver can be very large. The received SNR at the receiver can be very small, (e.g., at −20 dB). The assignment of carrier frequencies and the selection of (conjugate) cycle frequencies must be careful. When signal D is selected as the SOI, by setting the conjugate cycle frequency as $\alpha=2\times f_c+f_{baud}$ Hz for the ACS algorithm, the PU signal can be extracted, and the SINR performance and the power pattern at the $10^4$th sample, as shown in FIG. 6. At 600, the graph depicts signal D (10 dB) selected as the SOI, which is a weak one among the 7 signals. It is shown, at 604, that the ACS algorithm can effectively extract the desired signal, but the CAB algorithm at 606 fails, without filtering the other signals in the 10 MHz band. At 602, the related power beampattern is depicted showing beampattern for the ACS algorithm at 608 and for the CAB algorithm at 610.

Figure 7:
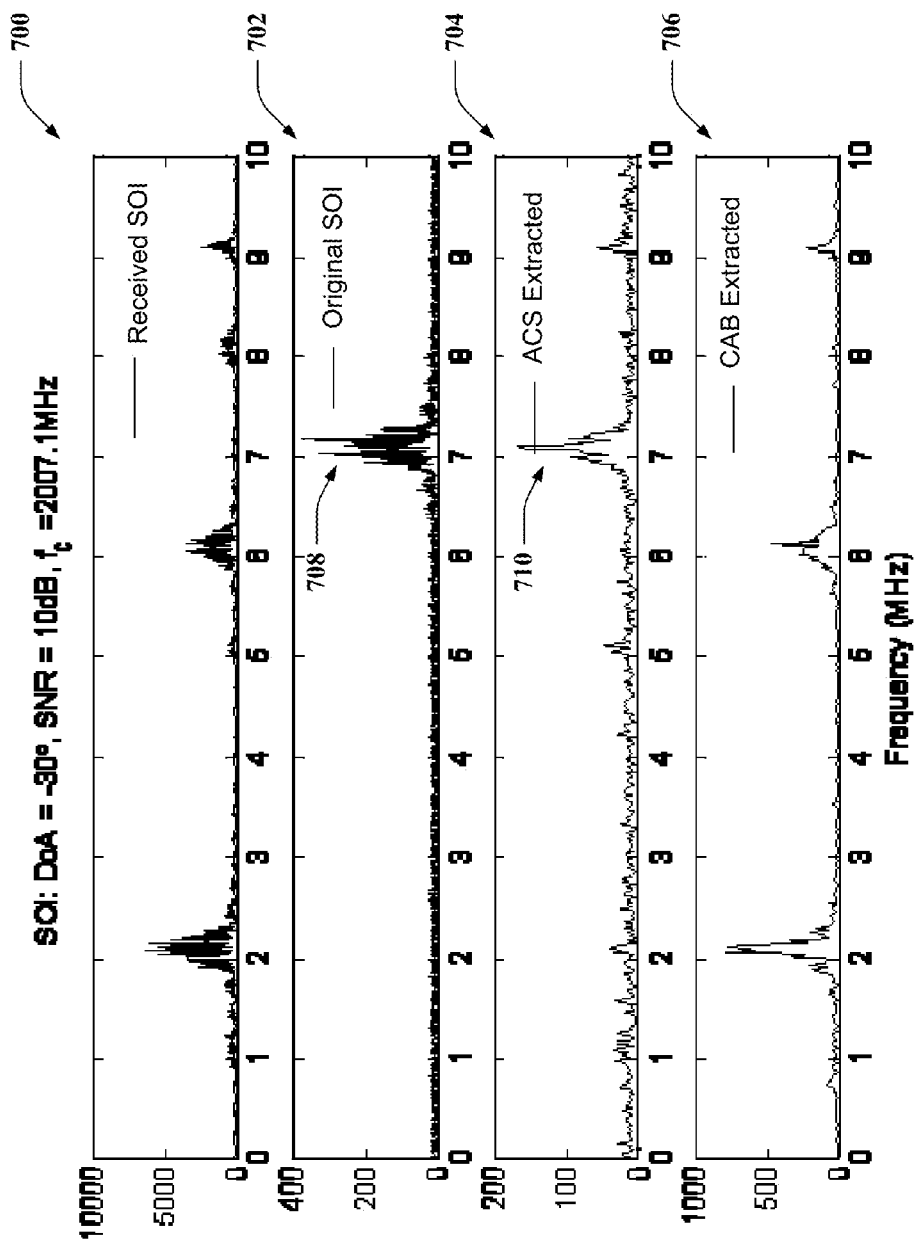

The spectrums of the received SOI, original SOI, and extracted signals using the ACS and CAB algorithms are shown in FIG. 7 respectively at 700, 702, 704, and 706. The spectrum is downconverted by 2 GHz to the baseband. It is shown that at 7.1 MHz (which corresponds to 2007.1 MHz) the ACS-extracted signal 704 has a spectrum peak at 710, which is present in the original signal 702 at 708, while the CAB-extracted signals at 706 have no peak at this location. Thus, the ACS can effectively identify that the channel centered 2007.1 MHz is occupied by a PU. Using conjugate cyclostationary based algorithms with $\alpha=2f_c+f_{baud}$ to detect the spectrum occupancy by the PU signals on all the channels, the SUs cannot be reliably detected, since the SU signals do not have conjugate cyclostationary property and both the ACS and CAB do not converge. The SINR performances of both the ACS and CAB can be undesirable, in an example. The extracted signal may typically have spectrum peaks at all the frequencies of the original signals.

Figure 8:
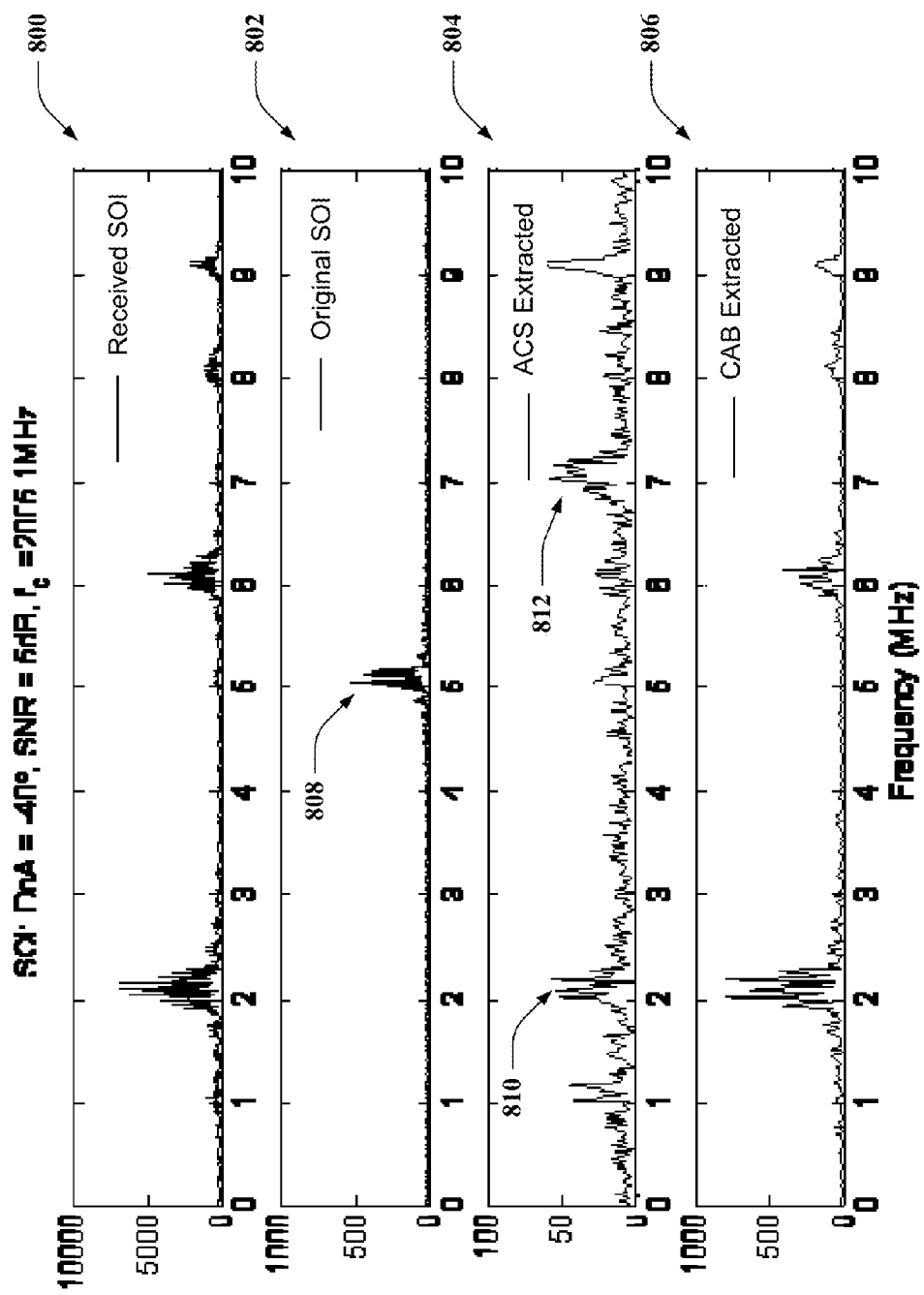

For example, at $f_c$=2005.1 MHz, the spectrum of the extracted signal is shown in FIG. 8, with the SOI received at 800, the original SOI at 802, the ACS-extracted signal at 804, and CAB-extracted signal at 806. The ACS algorithm may sometimes generate a spectrum sidelobe at $f_c$, shown at 810 and/or 812, though the original SOI at 802 can have a spectrum peak at 808, while the CAB algorithm most typically produces a spectrum null on this channel. From the ACS-extracted signal at 804, it can be identified that the channel is not occupied by a PU but it may be occupied by a SU. Since the SU signals are of 16QAM type, the SU occupancy can be further tested by using the cyclostationary-based ACS algorithm. For signal F, if the ACS at cycle frequency $\alpha=f_{baud}=\frac{1}{7}f_s$ is applied, the spectrum of the extracted signal is plotted in FIG. 9, with the SOI received at 900, the original SOI at 902, the ACS-extracted signal at 904, and CAB-extracted signal at 906. Once again, the ACS can extract signal F shown at 910, and represented in the original signal 902 at 908, but the CAB at 906 fails.

Figure 10:
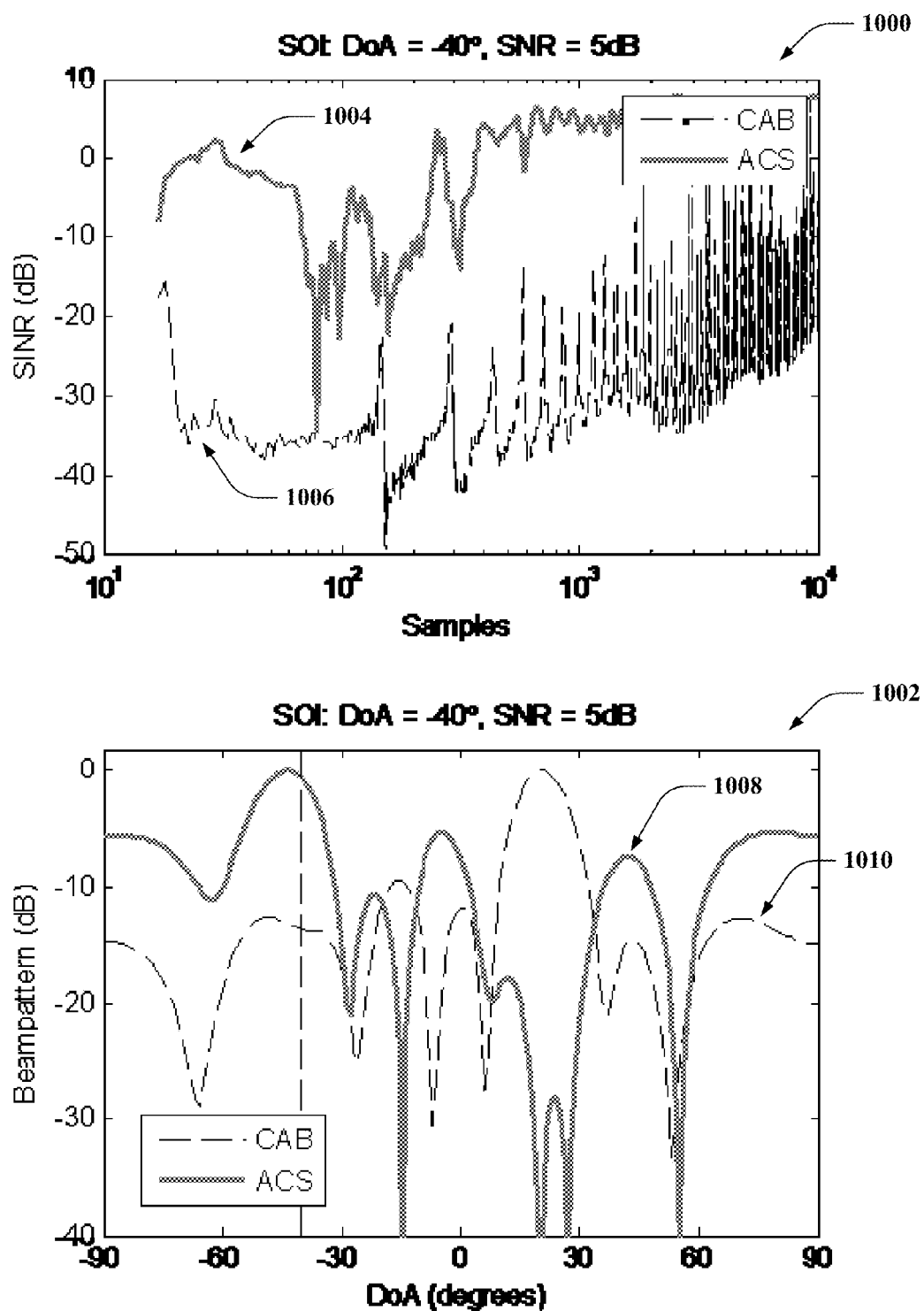

The corresponding SINR performance and the power pattern at the $10^4$th sample are shown in FIG. 10 at 1000, and the power beampattern at 1002. Thus, the ACS algorithm, shown at 1004, has better performance than the CAB algorithm, shown at 1006. The beampattern for the ACS algorithm relates to the curve at 1008, and the CAB to the curve at 1010. Thus, as described herein, the ACS algorithm proposed above is used for cyclostationary beamforming. The ACS algorithm generally converges at around 2000 samples when the signal-to-interference-ratio (SIR) γ is −20 dB or less. The number of samples required, N, should scale at between O(1/γ) and O(1/γ²). That is, the minimum number of required samples is less than that required for an energy detector.

Figure 11:
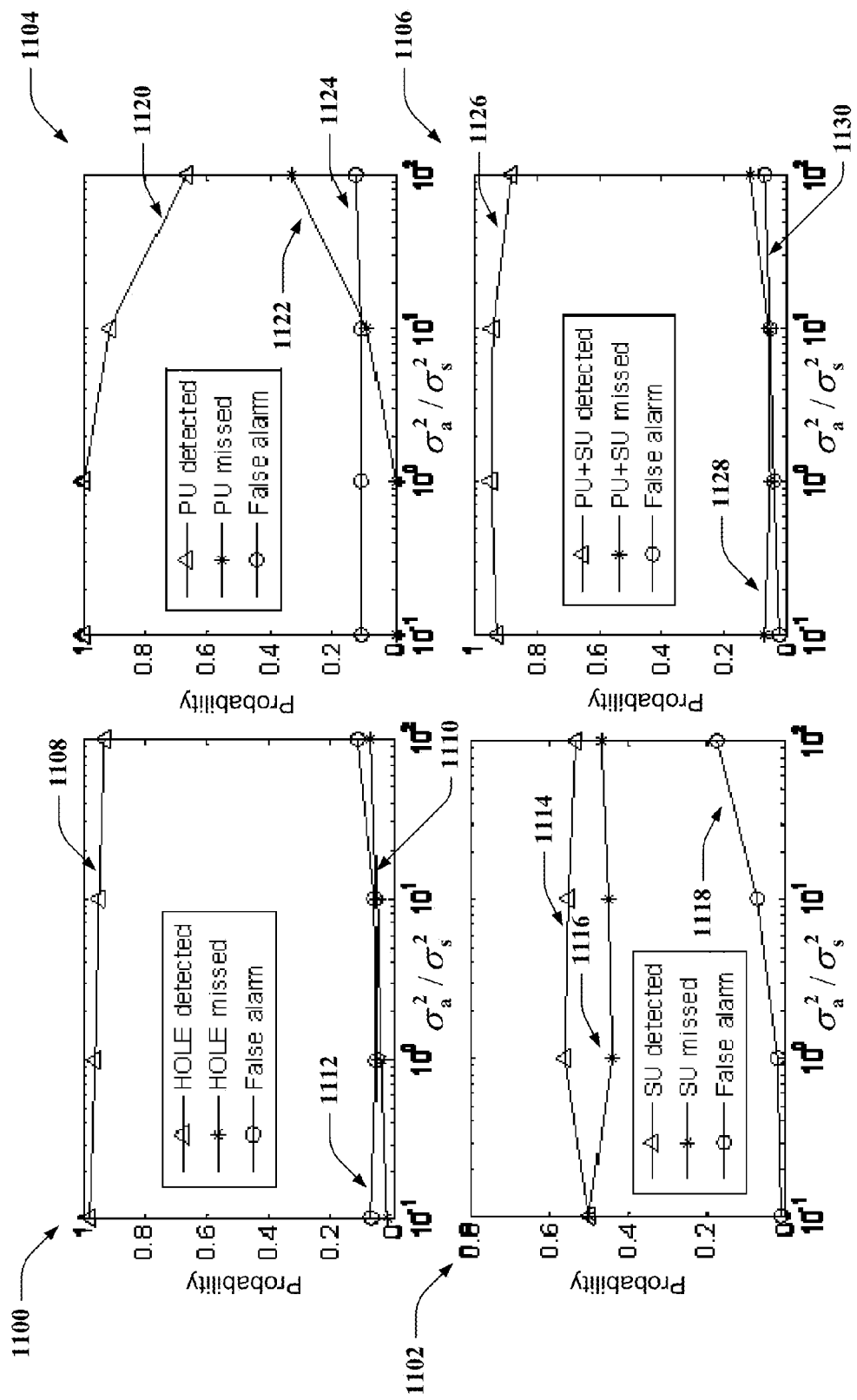
Figure 12:
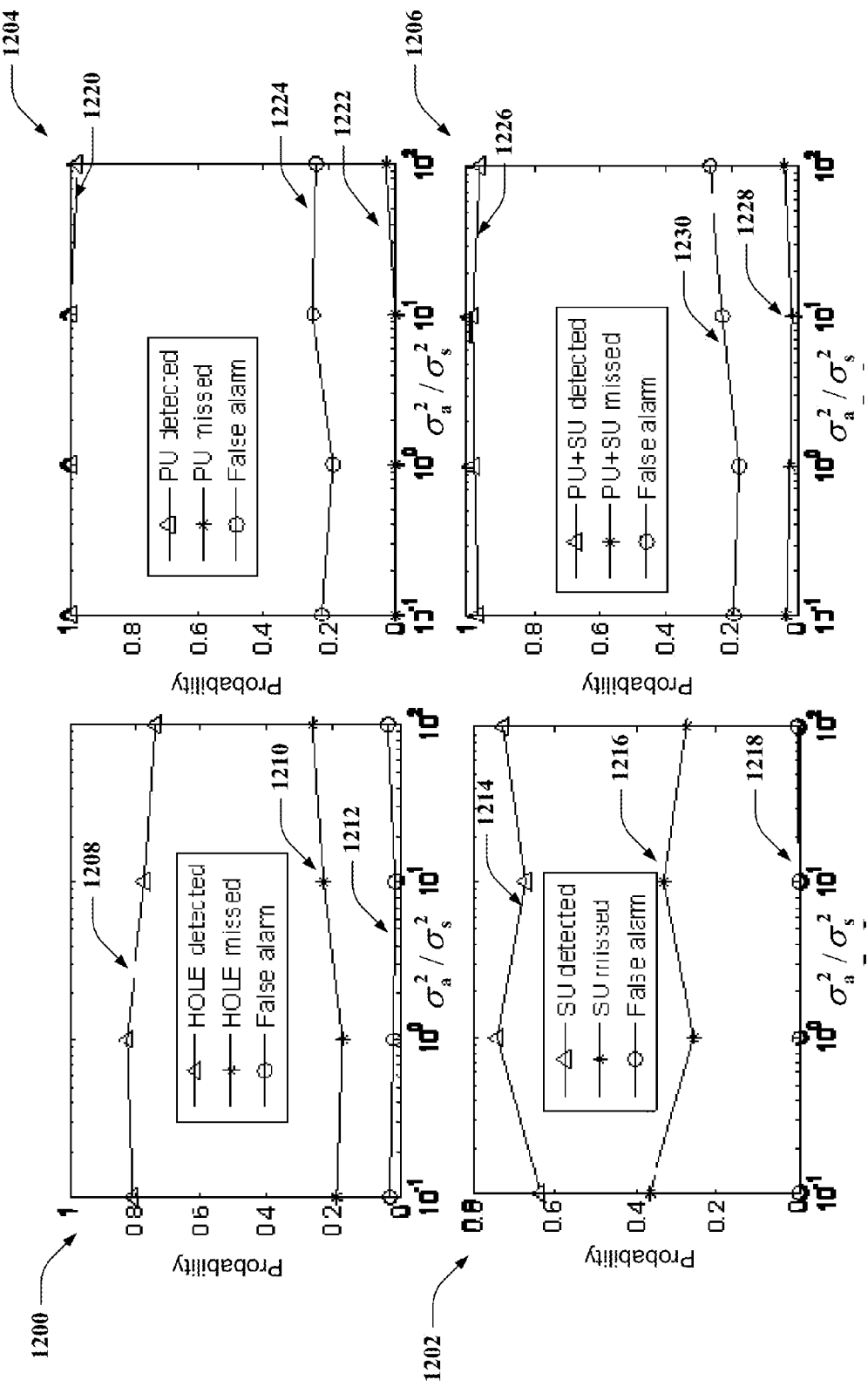
Figure 13:
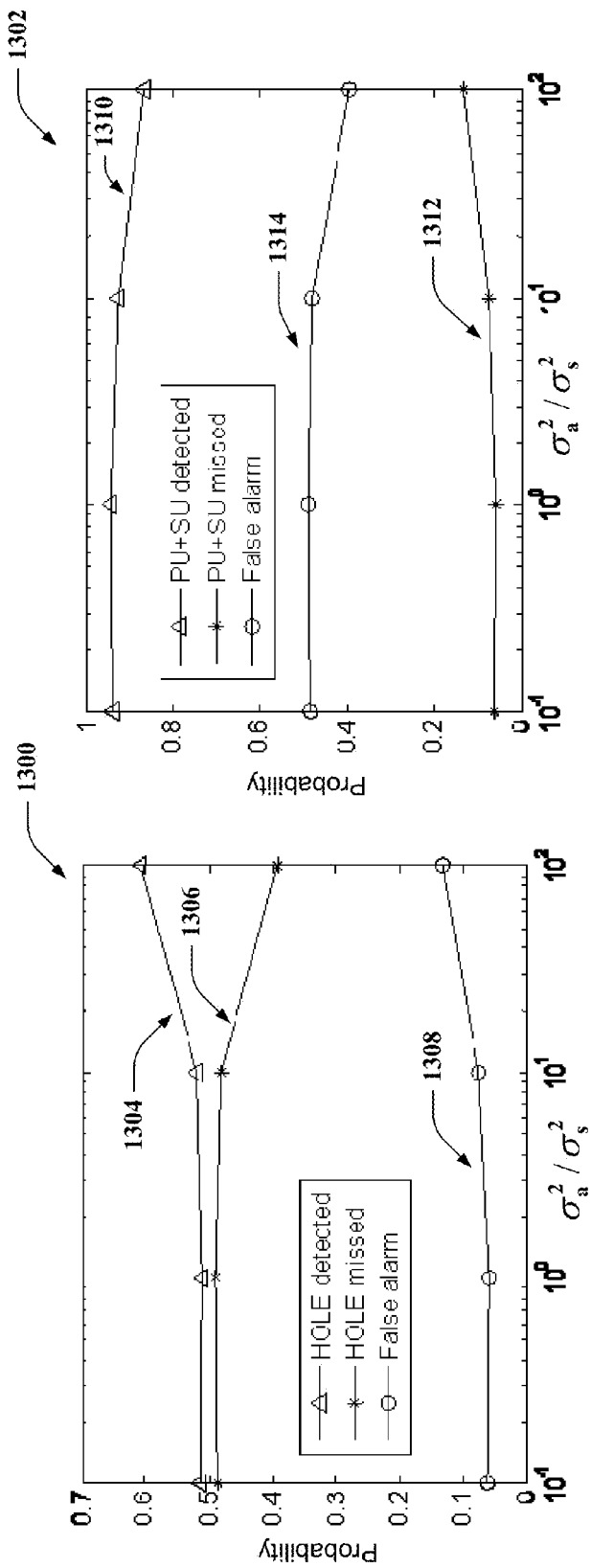

FIGS. 11-13 relate to implementing Monto Caro simulation for PU detection using the proposed algorithm. In this signal environment, conjugate cyclostationary beamforming is employed for PU detection with $\alpha=2f_c+f_{baud}$ and cyclostationary beamforming with $\alpha=f_{baud}$ for SU detection. The ACS algorithm is implemented for 5000 samples with a FFT length of 1024. As an initial implementation, conjugate cyclostationary-based ACS is utilized with $\alpha=2f_c+f_{baud}$ to detect the PUs; non-conjugate cyclostationary-based ACS for SU detection is not implemented so as to substantially reduce the computational cost, since it can be appreciated that the PU detection is more critical for CRs. For spectrum occupancy decision, if there is a mainlobe on the channel centered at $f_c$, the channel is occupied by a PU; if there is a sidelobe on the channel centered at $f_c$, it is occupied by a SU; if there is no lobe on the channel (assuming the peak in the channel is less than 4 times the mean power in the band), it is judged as a spectrum hole (e.g., vacancy as described herein). The result is shown in FIG. 11. It is shown that the probability for correct detection of PU is relatively good, but the probability of correct detection of SU is not satisfactory.

The results are shown in FIG. 11 at graphs 1100, 1102, 1104, and 1106, where $\sigma_a^2/\sigma_s^2$ are used to characterize the SNR. In particular, at graph 1100, the line at 1108 represents probability of a hole (or vacancy) being detected, the line at 1110 represents probability that a hole is missed, and the line at 1112 represents probability that there is a false alarm detected. Similarly, at graphs 1102, 1104, and 1106, the lines at 1114, 1120, and 1126 respectively represent probability of a SU, PU, and PU and SU are detected, the lines at 1116, 1122, and 1128 respectively represent probability that a SU, PU, and PU and SU are missed, and the lines at 1118, 1124, and 1130 respectively represent probability that there is a false alarm detected. The results are generally unsatisfactory. This is because some PU signals may be treated as SU signals, if the ACS-extracted generates a sidelobe rather than a mainlobe on the channel. Many channels occupied by SU signals are also treated as spectrum holes, since the SU signals do not have conjugate cyclostationary property and the algorithm cannot extract the signal on the channel. Thus, the results for SUs and spectrum holes are not reliable.

After applying the conjugate cyclostationary-based ACS at $\alpha=2f_c+f_{baud}$ at $f_c$, if there is a spectrum sidelobe at the channel, it can be either a PU or SU. By testing substantially all the possible SU data rates using the cyclostationary-based ACS algorithm until a spectrum mainlobe at the channel occurs, a SU can be determined; otherwise, it is not a SU and can be judged as a PU signal or a hole. The threshold for spectrum occupancy can be lowered to 3 times of the power mean in the band. The result is shown in FIG. 12 in the graphs at 1200, 1202, 1204, and 1206. In particular, at graph 1200, the line at 1208 represents probability of a hole (or vacancy) being detected, the line at 1210 represents probability that a hole is missed, and the line at 1212 represents probability that there is a false alarm detected. Similarly, at graphs 1202, 1204, and 1206, the lines at 1214, 1220, and 1226 respectively represent probability of a SU, PU, and PU and SU are detected, the lines at 1216, 1222, and 1228 respectively represent probability that a SU, PU, and PU and SU are missed, and the lines at 1218, 1224, and 1230 respectively represent probability that there is a false alarm detected. For this example, assuming that the possible SU signals are of type 16QAM with baud rates $$\frac{1}{7}f_s, \frac{1}{11}f_s, \text{ and } \frac{1}{13}f_s,$$

the probability of correct detection of PU signals has been improved over that shown in FIG. 11.

Energy detection is a simple and popular technique for spectrum sensing. It examines the signal power at a specified channel to judge the occupancy of the channel. This method cannot discriminate between PU and SU signals. It cannot detect a signal if it is buried in noise. Channel occupancy can be detected by bandpass-filtering a channel and then calculating the autocorrelation of the measured signal. An alternative method is implemented in the frequency domain, by examining the spectrum peak values at each channel. When the detection threshold is set as 6 times of the mean power in each channel, the result is shown in FIG. 13 in the graphs at 1300 and 1302. In particular, at graph 1300, the line at 1304 represents probability of a hole (or vacancy) being detected, the line at 1306 represents probability that a hole is missed, and the line at 1308 represents probability that there is a false alarm detected. Similarly, at graph 1302, the line at 1310 represents probability of a PU and SU detected, the line at 1312 represents probability that a PU and SU are missed, and the line at 1314 represents probability that there is a false alarm detected. Note that for the energy detection approach only one antenna is used and $\sigma_a^2$ is the noise power at the single antenna.

Compared to the result by the proposed approach in FIG. 12, for a similar correct detection probability of channel occupancy (PU+SU), the probability of correct detection of spectrum holes is relatively lower in the energy detection approach; this corresponds to lower spectrum efficiency. By decreasing the detection threshold, the probability of correct detection of occupied channels is increased to more closed to 100%; this, however, further reduces the probability of correct detection of spectrum holes, and hence the spectrum efficiency.

In addition, the proposed spectrum sensing approach has the capability of correctly identifying PU and SU signals, which cannot be accomplished using energy detection. In FIG. 12, the probability of correctly identifying the SU signal is much far from 100%; this is because one of the two SU (signal F) is too weak. Another advantage is that the proposed method can extract and sense substantially all the co-channel signals on the same channel ($f_c$), as long as they have different $\alpha$ values or cyclostationary properties. This property can be applied to spread-spectrum signals, but it requires each signals has different data rates or coding schemes. In contrast, the energy detection technique can only identify that the channel is occupied, but it cannot identify the nature of the signals.

Figure 14:
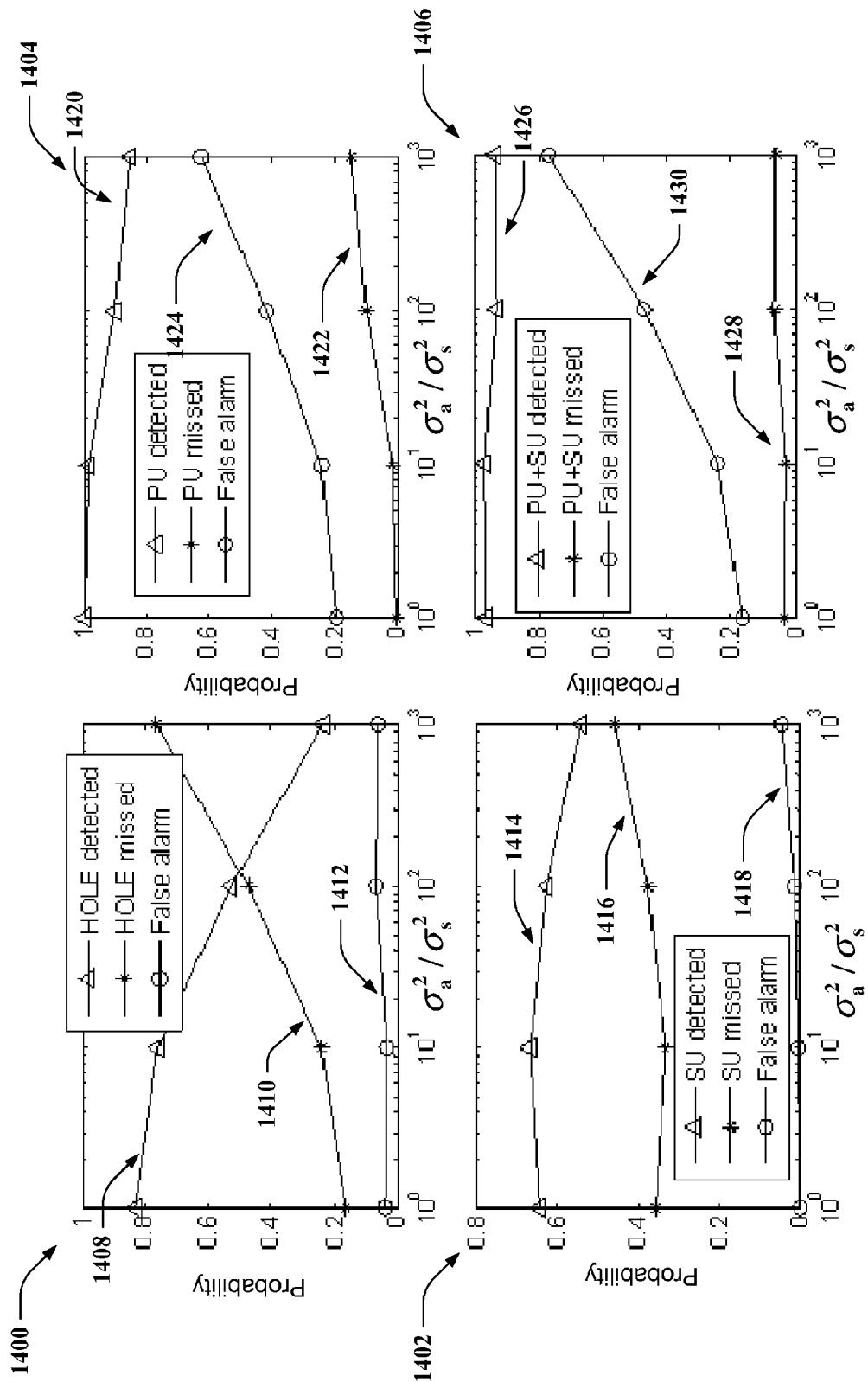
Figure 15:
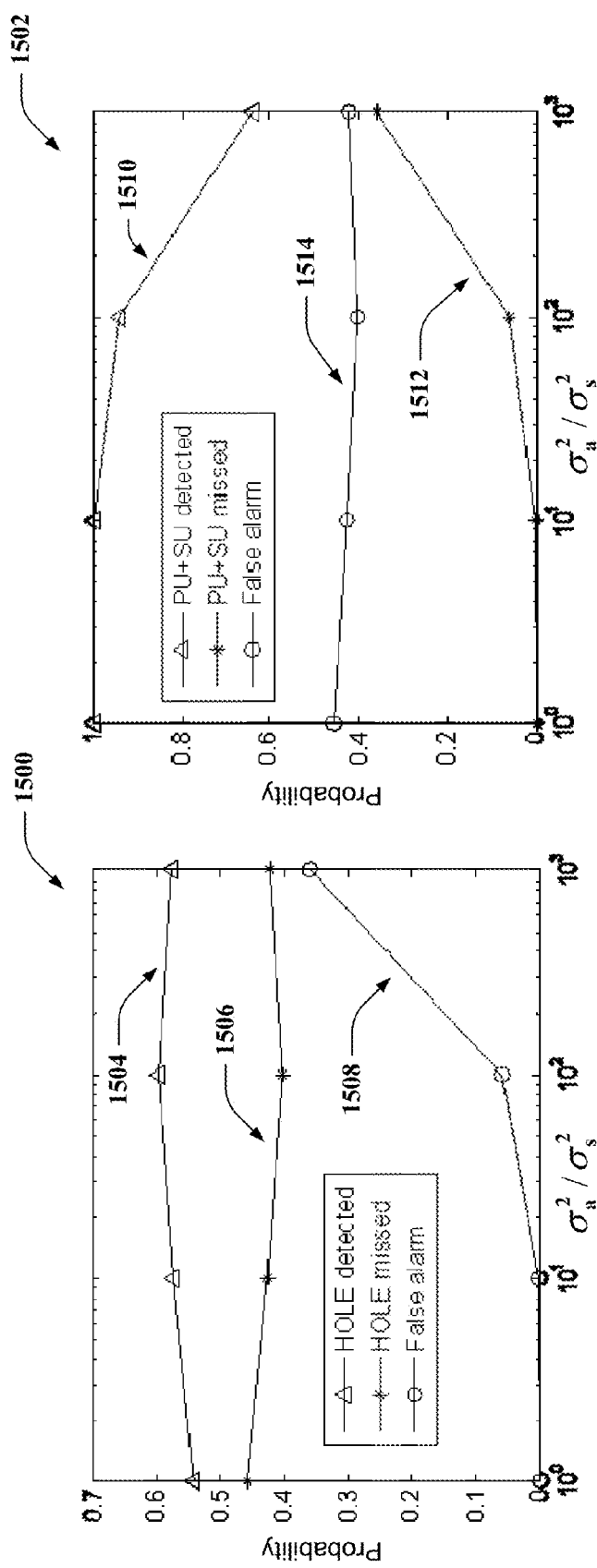

Finally, when checking the case that all the signals have the same low power (with a SNR of 10 dB, i.e., a signal power of 0.1), the results for the proposed approach and the energy detection approach are shown in FIGS. 14 and 15 (for the detection threshold is 5 times of the mean power in each channel), respectively. In particular, in FIG. 14, at graph 1400, the line at 1408 represents probability of a hole (or vacancy) being detected, the line at 1410 represents probability that a hole is missed, and the line at 1412 represents probability that there is a false alarm detected. Similarly, at graphs 1402, 1404, and 1406, the lines at 1414, 1420, and 1426 respectively represent probability of a SU, PU, and PU and SU are detected, the lines at 1416, 1422, and 1428 respectively represent probability that a SU, PU, and PU and SU are missed, and the lines at 1418, 1424, and 1430 respectively represent probability that there is a false alarm detected.

In addition, in FIG. 15, at graph 1500, the line at 1504 represents probability of a hole (or vacancy) being detected, the line at 1506 represents probability that a hole is missed, and the line at 1508 represents probability that there is a false alarm detected. Similarly, at graph 1502, the line at 1510 represents probability of a PU and SU detected, the line at 1512 represents probability that a PU and SU are missed, and the line at 1514 represents probability that there is a false alarm detected. The proposed approach is shown to generate much higher probability of correctly identifying the PU and PU+SU, even at very high array noise, though at a cost of very high false alarm.

Figure 16:
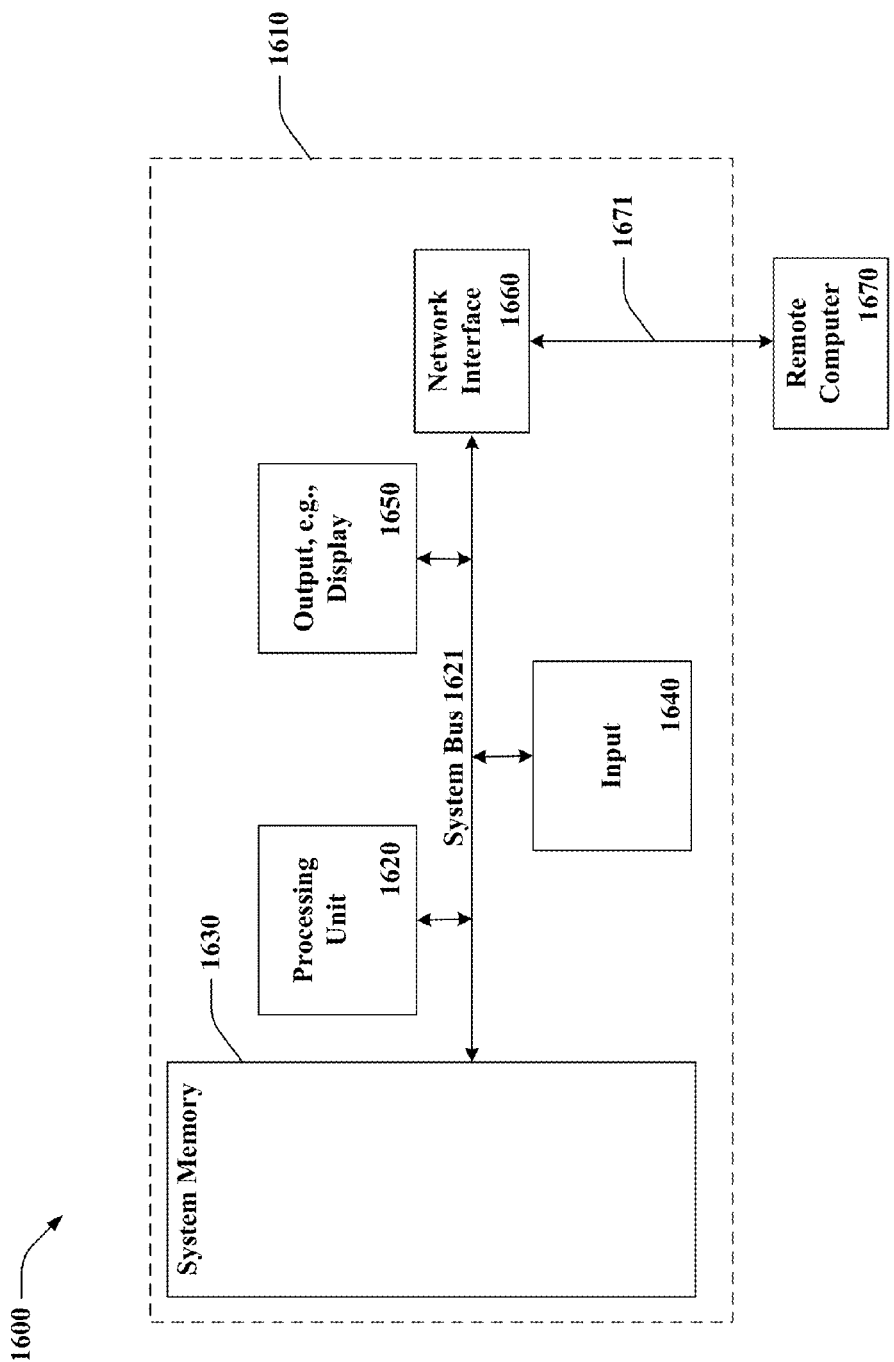
FIG. 16 illustrates a block diagram of an example operating environment in which various aspects described herein can function.

Turning to FIG. 16, an exemplary non-limiting computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a communications system may be desirably configured. Accordingly, the below general purpose remote computer described below is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer executable instructions, such as program modules, being executed by one or more computers, such as client workstations, servers or other devices. Those skilled in the art will appreciate that the claimed subject matter can also be practiced with other computer system configurations and protocols.

FIG. 16 thus illustrates an example of a suitable computing system environment 1600 in which the claimed subject matter can be implemented, although as made clear above, the computing system environment 1600 is only one example of a suitable computing environment for a media device and is not intended to suggest any limitation as to the scope of use or functionality of the claimed subject matter. Further, the computing environment 1600 is not intended to suggest any dependency or requirement relating to the claimed subject matter and any one or combination of components illustrated in the example operating environment 1600.

With reference to FIG. 16, an example of a remote device for implementing various aspects described herein includes a general purpose computing device in the form of a computer 1610. Components of computer 1610 can include, but are not limited to, a processing unit 1620, a system memory 1630, and a system bus 1621 that couples various system components including the system memory 1630 to the processing unit 1620. The system bus 1621 can be any of several types of bus structures including a memory bus or memory controller, a peripheral bus, and a local bus using any of a variety of bus architectures.

Computer 1610 can include a variety of computer readable media. Computer readable media can be any available media that can be accessed by computer 1610. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1610. Communication media can embody computer readable instructions, data structures, program modules or other data in a modulated data signal such as a carrier wave or other transport mechanism and can include any suitable information delivery media.

The system memory 1630 can include computer storage media in the form of volatile and/or nonvolatile memory such as read only memory (ROM) and/or random access memory (RAM). A basic input/output system (BIOS), containing the basic routines that help to transfer information between elements within computer 1610, such as during start-up, can be stored in memory 1630. Memory 1630 can also contain data and/or program modules that are immediately accessible to and/or presently being operated on by processing unit 1620. By way of non-limiting example, memory 1630 can also include an operating system, application programs, other program modules, and program data.

The computer 1610 can also include other removable/non-removable, volatile/nonvolatile computer storage media. For example, computer 1610 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1621 through a non-removable memory interface such as an interface, and a magnetic disk drive or optical disk drive can be connected to the system bus 1621 by a removable memory interface, such as an interface.

A user can enter commands and information into the computer 1610 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1620 through user input 1640 and associated interface(s) that are coupled to the system bus 1621, but can be connected by other interface and bus structures, such as a parallel port, game port or a universal serial bus (USB). A graphics subsystem can also be connected to the system bus 1621. In addition, a monitor or other type of display device can be connected to the system bus 1621 via an interface, such as output interface 1650, which can in turn communicate with video memory. In addition to a monitor, computers can also include other peripheral output devices, such as speakers and/or a printer, which can also be connected through output interface 1650.

The computer 1610 can operate in a networked or distributed environment using logical connections to one or more other remote computers, such as remote computer 1670, which can in turn have media capabilities different from device 1610. The remote computer 1670 can be a personal computer, a server, a router, a network PC, a peer device or other common network node, and/or any other remote media consumption or transmission device, and can include any or all of the elements described above relative to the computer 1610. The logical connections depicted in FIG. 16 include a network 1671, such local area network (LAN) or a wide area network (WAN), but can also include other networks/buses.

Such networking environments are commonplace in homes, offices, enterprise-wide computer networks, intranets and the Internet.

When used in a LAN networking environment, the computer 1610 is connected to the LAN 1671 through a network interface or adapter 1660. When used in a WAN networking environment, the computer 1610 can include a communications component, such as a modem, or other means for establishing communications over the WAN, such as the Internet. A communications component, such as a modem, which can be internal or external, can be connected to the system bus 1621 via the user input interface at input 1640 and/or other appropriate mechanism. In a networked environment, program modules depicted relative to the computer 1610, or portions thereof, can be stored in a remote memory storage device. It should be appreciated that the network connections shown and described are exemplary and other means of establishing a communications link between the computers can be used.

Figure 17:
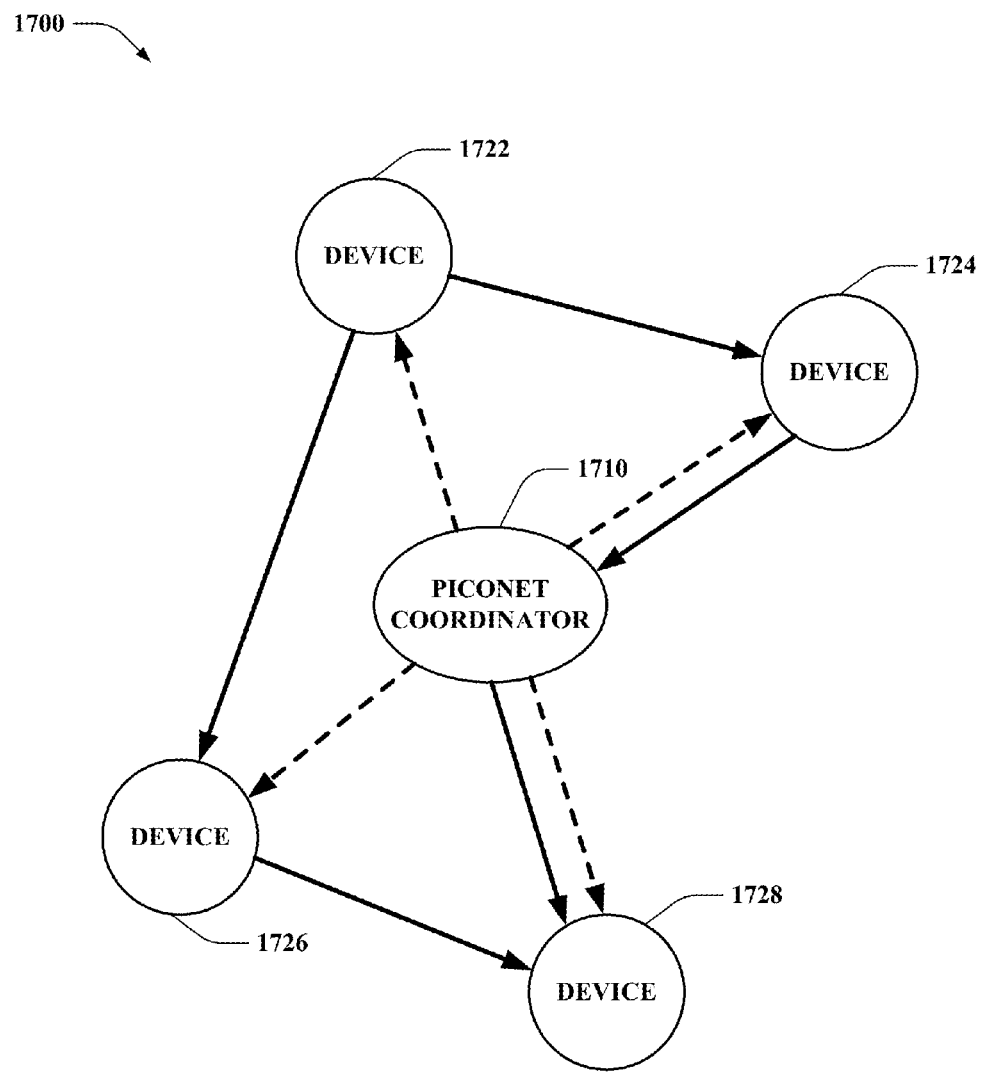
FIG. 17 illustrates an example wireless communication network in which various aspects described herein can be utilized.
Figure 18:
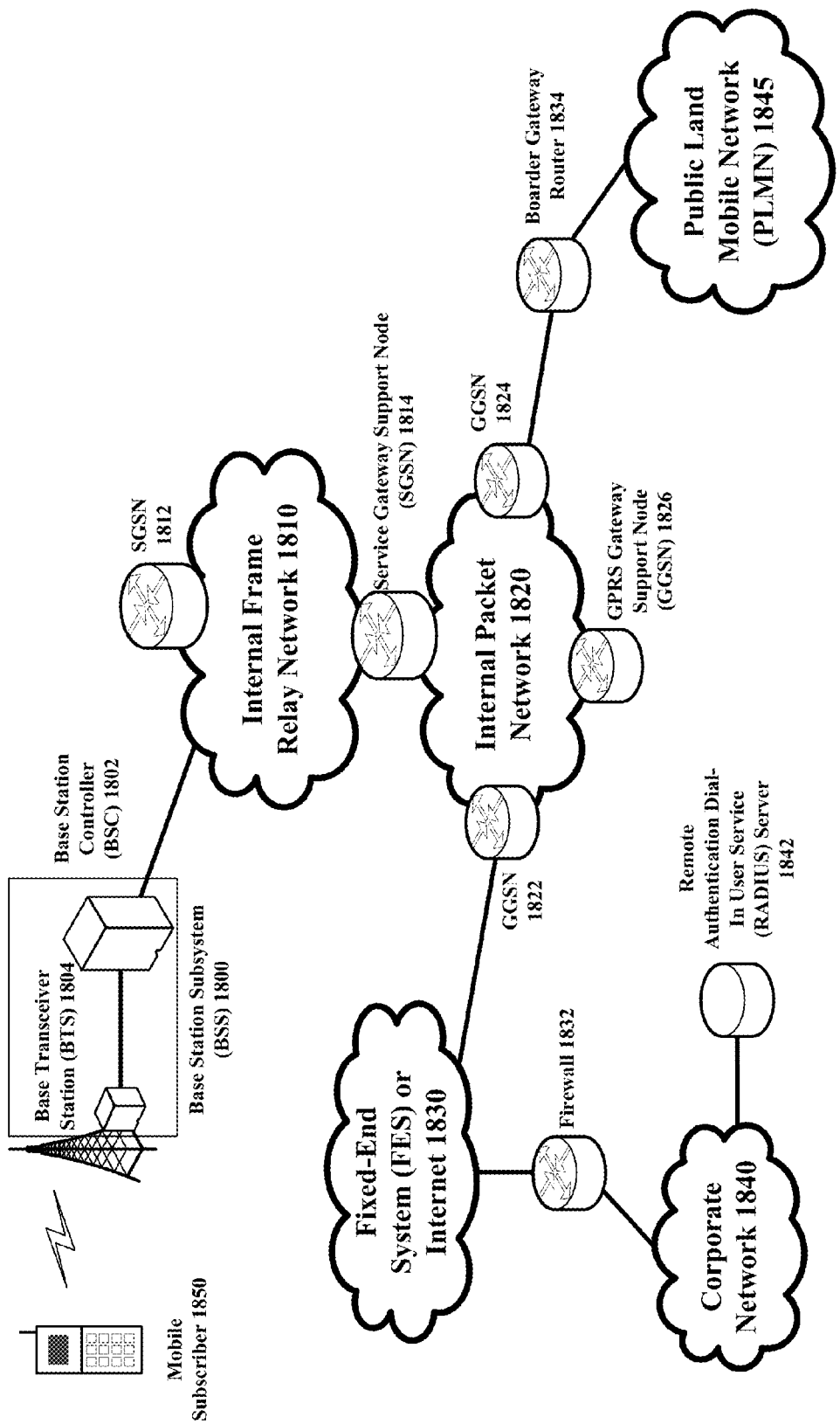
FIG. 18 illustrates an overview of a wireless network environment suitable for service by various aspects described herein.

Turning now to FIGS. 17-18, an overview of network environments in which the claimed subject matter can be implemented is illustrated. The above-described systems and methodologies can be applied to any wireless communication network; however, the following description sets forth some exemplary, non-limiting operating environments for said systems and methodologies. The below-described operating environments should be considered non-exhaustive, and thus the below-described network architectures are merely examples of network architectures into which the claimed subject matter can be incorporated. It is to be appreciated that the claimed subject matter can be incorporated into any now existing or future alternative communication network architectures as well.

Referring first to FIG. 17, a wireless personal area network (WPAN) architecture 1700 based on the IEEE 802.15.3 high data rate WPAN standard is illustrated. Based on the IEEE 802.15.3 standard, the WPAN architecture 1700 can include one or more piconets. As used herein, a piconet is an ad hoc network of independent data devices 1710-1728 that can engage in peer-to-peer communication. FIG. 17 illustrates one such piconet. In one example, the range of a piconet is confined to a personal area of, for example, 10 to 50 meters, although a piconet can alternatively provide coverage for a larger or smaller coverage area.

In accordance with one aspect, a piconet can be established by a device 1710 that is capable of becoming a piconet coordinator (PNC). The device 1710 can establish the piconet by scanning a set of available communication channels (e.g., communication channels corresponding to time frequency codes in an MB-OFDM communication environment) for a channel having a least amount of interference that is not in use by neighboring piconets. Once such a communication channel is found, the device 1710 can become a PNC and begin transmitting control messaging in the form of beacons to allow other devices 1722-1728 to connect to the piconet. As illustrated in architecture 1700, beacons transmitted by PNC 1710 are shown by dotted lines.

Once a PNC 1710 establishes a piconet, one or more devices 1722-1728 can associate with the PNC 1710 based on beacons transmitted by the PNC 1710. In one example, beacons provided by a PNC 1710 can provide timing information, and a device 1722-1728 can perform one or more timing synchronization techniques based on received beacons as described supra while associating with the piconet coordinated by the PNC 1710. In addition, beacons transmitted by the PNC 1710 can also contain information relating to quality of service (QoS) parameters, time slots for transmission by devices 1722-1728 in the piconet, and/or other suitable information. After a device 1722-1728 has successfully associated with the piconet, it can then communicate in the piconet by transmitting data to the PNC 1710 and/or one or more other devices 1722-1728 in the piconet. As illustrated in architecture 1700, data transmissions are indicated by solid lines.

In accordance with one aspect, the PNC 1710 and devices 1722-1728 can additionally communicate using ultra-wideband (UWB) communication. When UWB is used, the PNC 1710 and/or devices 1722-1728 can communicate beacons and/or data using short-duration pulses that span a wide range of frequencies. In one example, transmissions made pursuant to UWB can occupy a spectrum of greater than 20% of a center frequency utilized by the network or a bandwidth of at least 500 MHz. Accordingly, UWB transmissions can be conducted using a very low power level (e.g., approximately 0.2 mW), which can allow UWB transmission to be conducted in common bands with other forms of communication without introducing significant interference levels. Because UWB operates at a low power level, it should be appreciated that UWB is typically confined to a small coverage area (e.g., approximately 10 to 100 meters), which can correspond to the coverage area of an associated piconet. However, by transmitting in short radio bursts that span a large frequency range, devices utilizing UWB can transmit significantly large amounts of data without requiring a large amount of transmit power. Further, because of the large bandwidth range and low transmit power used in UWB transmission, signals transmitted utilizing UWB can carry through obstacles that can reflect signals at lower bandwidth or higher power.

Turning now to FIG. 18, various aspects of the global system for mobile communication (GSM) are illustrated. GSM is one of the most widely utilized wireless access systems in today's fast growing communications systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the timing synchronization techniques described herein may be applied independently of the method of data transport, and does not depend on any particular network architecture or underlying protocols.

FIG. 18 depicts an overall block diagram of an exemplary packet-based mobile cellular network environment, such as a GPRS network, in which the claimed subject matter can be practiced. Such an environment can include a plurality of Base Station Subsystems (BSS) 1800 (only one is shown), each of which can comprise a Base Station Controller (BSC)

1802 serving one or more Base Transceiver Stations (BTS) such as BTS 1804. BTS 1804 can serve as an access point where mobile subscriber devices 1850 become connected to the wireless network. In establishing a connection between a mobile subscriber device 1850 and a BTS 1804, one or more timing synchronization techniques as described supra can be utilized.

In one example, packet traffic originating from mobile subscriber 1850 is transported over the air interface to a BTS 1804, and from the BTS 1804 to the BSC 1802. Base station subsystems, such as BSS 1870, are a part of internal frame relay network 1810 that can include Service GPRS Support Nodes ("SGSN") such as SGSN 1812 and 1814. Each SGSN is in turn connected to an internal packet network 1820 through which a SGSN 1812, 1814, etc., can route data packets to and from a plurality of gateway GPRS support nodes (GGSN) 1822, 1824, 1826, etc. As illustrated, SGSN 1814 and GGSNs 1822, 1824, and 1826 are part of internal packet network 1820. Gateway GPRS serving nodes 1822, 1824 and 1826 can provide an interface to external Internet Protocol ("IP") networks such as Public Land Mobile Network ("PLMN") 1845, corporate intranets 1840, or Fixed-End System ("FES") or the public Internet 1830. As illustrated, subscriber corporate network 1840 can be connected to GGSN 1822 via firewall 1832; and PLMN 1845 can be connected to GGSN 1824 via boarder gateway router 1834. The Remote Authentication Dial-In User Service ("RADIUS") server 1842 may also be used for caller authentication when a user of a mobile subscriber device 1850 calls corporate network 1840.

Generally, there can be four different cell sizes in a GSM network—macro, micro, pico, and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The claimed subject matter has been described herein by way of examples. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Additionally, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The terms "article of manufacture," "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g., according to a hierarchical arrangement. Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

What is claimed is:

1. A system, comprising:
   at least one processor, communicatively coupled to at least one memory storing computer-executable components, that facilitates execution of the computer-executable components, wherein the computer-executable components comprise:
   a beamforming component configured to extract one or more signals received in a first frequency band based on a cycle frequency related to a primary device of a cognitive radio network;
   a signal identification component configured to determine whether the one or more signals relate to the primary device; and
   an information receiving component configured to receive, from a different device, an indication of one or more portions of the first frequency band that are currently not utilized by the primary device based on a cooperative measurement of the one or more portions of the first frequency band made by the signal identification component and at least one other wireless device.

2. The system of claim 1, wherein the signal identification component is further configured to select at least one of the one or more portions of the first frequency band for communication based at least in part on the indication of the one or more portions of the first frequency band.

3. The system of claim 1, wherein the computer-executable components further comprise a relay component configured to relay information between the primary device and a secondary device of the cognitive radio network.

4. The system of claim 1, wherein the computer-executable components further comprise a forwarding component configured to forward a decision by the signal identification component to a common receiver.

5. The system of claim 1, wherein the signal identification component is further configured to determine that the one or more signals relate to the primary device based at least in part on detection of a spectrum mainlobe in the one or more signals.

6. The system of claim 1, wherein the computer-executable components further comprise a cognition management component configured to determine whether to utilize a portion of a second frequency band for secondary communication based at least in part on a determination of whether the one or more signals are related to the primary device.

7. The system of claim 1, wherein the beamforming component is further configured to extract the one or more signals using an adaptive cross self-coherent restoral process.

8. The system of claim 1, wherein the signal identification component is further configured to determine whether the one or more signals relate to a secondary device of the cognitive radio network or is vacant.

9. A method, comprising:
   extracting, by a system including a processor, one or more signals in a frequency band based on a cycle frequency related to a primary device of a cognitive radio network;
   determining whether the one or more signals relate to the primary device; and
   receiving data specifying one or more portions of the frequency band that are currently not utilized by the primary device, the data based on a cooperative measurement of one or more portions of the frequency band made by the system and at least one other system.

10. The method of claim 9, further comprising selecting at least one of the one or more portions of the frequency band for communication based at least in part on the data specifying the one or more portions.

11. The method of claim 9, further comprising relaying information between the primary device and a secondary device of the cognitive radio network.

12. The method of claim 9, further comprising:
    forwarding a result of the determining to a common receiver component; and
    receiving the data specifying one or more portions of the frequency band from the common receiver component.

13. The method of claim 9, further comprising:
    detecting a spectrum mainlobe in the one or more signals; and
    determining that the one or more signals relate to the primary device based at least in part on the detecting.

14. The method of claim 9, wherein the extracting comprises extracting the one or more signals using an adaptive cross self-coherent restoral process.

15. The method of claim 9, further comprising determining whether the one or more signals relate to a secondary device of the cognitive radio network or is vacant.

16. A system, comprising:
    means for extracting at least one signal received on a cycle frequency, of a frequency band, related to a primary device of a cognitive radio network;
    means for determining whether the at least one signal relates to the primary device; and
    means for receiving, from a different device that is different than the primary device, data identifying at least one portion of the frequency band that is currently not used by the primary device, the data based on a cooperative measurement of the at least one portion of the frequency band made by the means for determining and the different device.

17. The system of claim 16, further comprising means for selecting a portion, of the at least one portion of the frequency band, for communication based at least in part on the data identifying the at least one portion of the frequency band.

18. The system of claim 16, further comprising means for relaying information between the primary device and a secondary device of the cognitive radio network.

19. A computer-readable medium having store thereon computer-executable instructions that, in response to execution, cause a computing system including a processor to perform operations, the operations comprising:
    analyzing, by a first device of a cognitive radio network, a cycle frequency of the one or more signals in a frequency band;
    determining whether the one or more signals relate to a primary device of the cognitive radio network based on the analyzing; and
    receiving, from a disparate device, an indication of one or more channels of the frequency band currently not used by the primary device, wherein the indication is based on a cooperative measurement of the one or more portions of the frequency band performed by the first device and a second device of the cognitive radio network.

20. The computer-readable medium of claim 19, the operations further comprising selecting a portion, of the one or more portions of the first frequency band, for communication based at least in part on the indication.

* * * * *

UNITED STATES PATENT AND TRADEMARK OFFICE
CERTIFICATE OF CORRECTION

PATENT NO. : 8,422,958 B2  Page 1 of 3
APPLICATION NO. : 13/485530
DATED : April 16, 2013
INVENTOR(S) : Du et al.

It is certified that error appears in the above-identified patent and that said Letters Patent is hereby corrected as shown below:

On the Title Page, in Item (56), under "OTHER PUBLICATIONS", in Column 1, Line 10, delete "detection,", IEEE Trans Commun.," and insert -- detection," IEEE Trans. Commun., --, therefor.

On Title Page 2, in Item (56), under "OTHER PUBLICATIONS", in Column 1, Line 39, delete "Commun," and insert -- Commun., --, therefor.

On Title Page 2, in Item (56), under "OTHER PUBLICATIONS", in Column 2, Line 3, delete "2004.," and insert -- 2004, --, therefor.

On Title Page 2, in Item (56), under "OTHER PUBLICATIONS", in Column 2, Line 42, delete "Syst" and insert -- Syst. --, therefor.

In the Drawings

In Fig. 6, Sheet 6 of 18, delete " 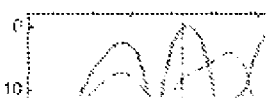 " and insert -- 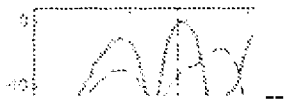 --, therefor.

In Fig. 6, Sheet 6 of 18, delete " " and insert -- --, therefor.

In Fig. 8, Sheet 8 of 18, delete " " and insert -- --, therefor.

Signed and Sealed this
Twelfth Day of November, 2013

Teresa Stanek Rea
*Deputy Director of the United States Patent and Trademark Office*

CERTIFICATE OF CORRECTION (continued)
U.S. Pat. No. 8,422,958 B2

In Fig. 8, Sheet 8 of 18, delete " 4 5 " and insert -- 4 5 --, therefor.

Figure 9:
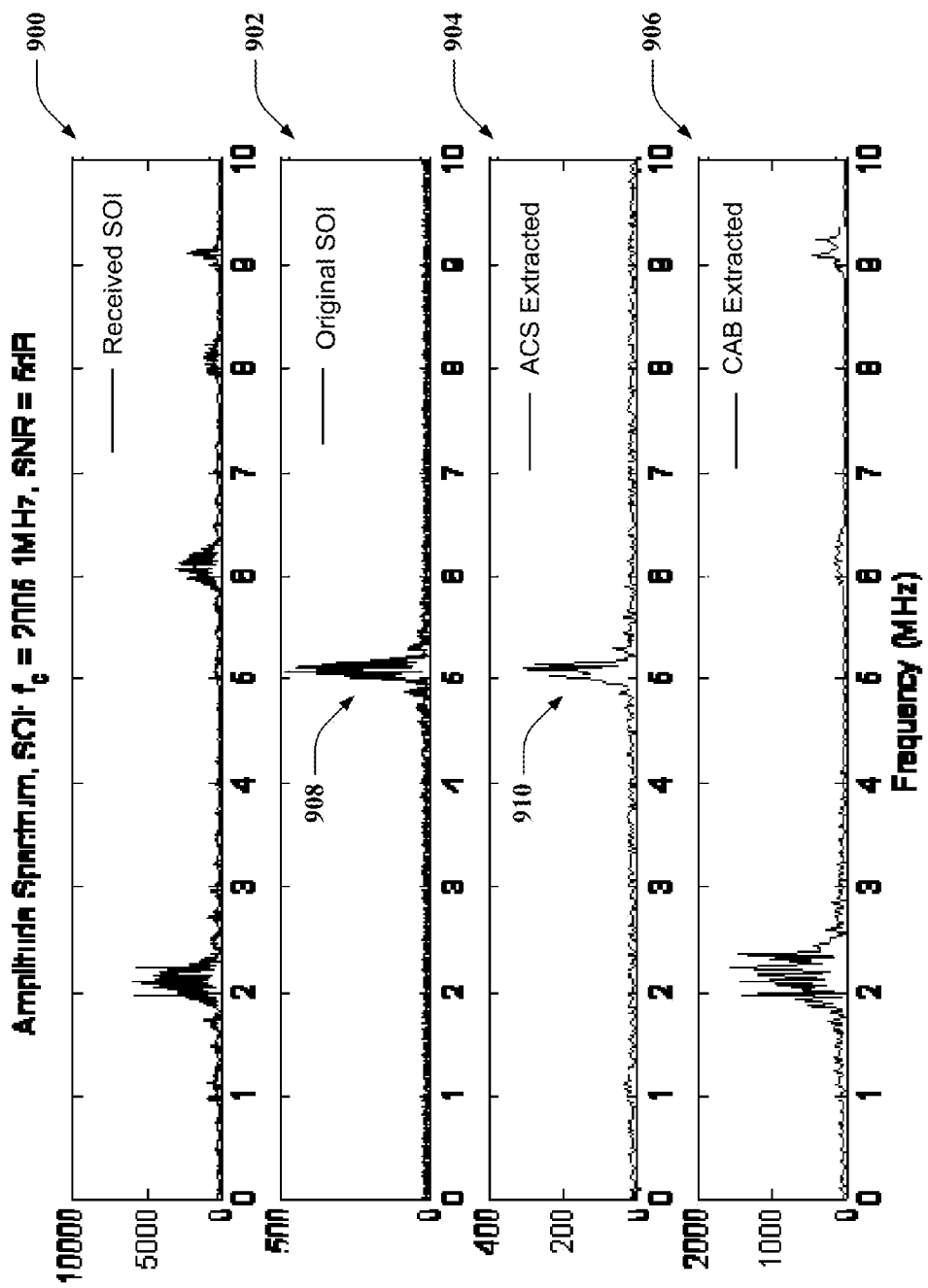

In Fig. 9, Sheet 9 of 18, delete " Amplitude Spectrum, SOI: f_c = 2006.1MHz, SNR = 5dB ", and insert -- Amplitude Spectrum, SOI: f_c = 2006.1MHz, SNR = 5dB --, therefor.

In Fig. 9, Sheet 9 of 18, delete " 4 5 " and insert -- 4 5 --, therefor.

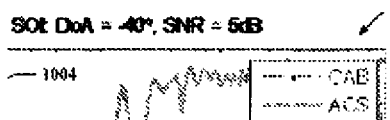

In Fig. 10, Sheet 10 of 18, delete " " and insert

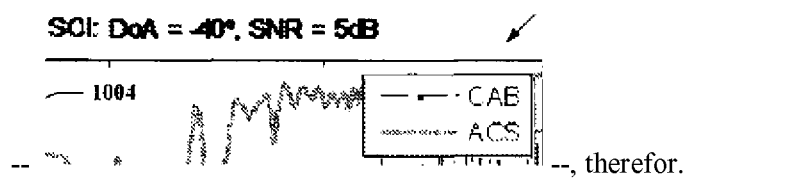

--, therefor.

In Fig. 12, Sheet 12 of 18, delete " 0.2 " and insert -- 0.2 --, therefor.

In Fig. 13, Sheet 13 of 18, delete " " and insert -- --, therefor.

In Fig. 13, Sheet 13 of 18, delete " 10¹ " and insert -- 10¹ --, therefor.

CERTIFICATE OF CORRECTION (continued)
U.S. Pat. No. 8,422,958 B2

In the Specification

In Column 2, Line 13, delete "SOL" and insert -- SOI, --, therefor.

In Column 4, Line 26, delete "SOL" and insert -- SOI. --, therefor.

In Column 8, Line 67, delete "$u(t) = x^{(*)}(t-\tau)e^{j2\pi\alpha}$" and insert -- $\mathbf{u}(t) = \mathbf{x}^{(*)}(t-\tau)e^{j2\pi\alpha t}$ --, therefor.

In Column 10, Line 1, delete "$R_{xx}^{-1}(1) = [R_{xx}^{-1}(1)]^{-1}$." and insert -- $R_{xx}^{-1}(1) = [R_{xx}(1)]^{-1}$. --, therefor.

In Column 10, Line 11, delete "R" and insert -- $R_I$ --, therefor.

In Column 13, Lines 19-20, delete "information sharing component 404" and insert -- information sharing component 406 --, therefor.

In Column 16, Line 65, delete "Monto Caro" and insert -- Monte Carlo --, therefor.

In Column 17, Line 1, delete "α=2f$_c$+f$_{baud}$" and insert -- α=2f$_c$+f$_{baud}$, --, therefor.

In Column 23, Lines 8-9, delete "mobile subscriber 1850" and insert -- mobile subscriber device 1850 --, therefor.